United States Patent
Ohara

(10) Patent No.: US 8,447,973 B2
(45) Date of Patent: May 21, 2013

(54) SYSTEM, SERVER, AND DEVICE FOR PROVIDING CONTENTS

(75) Inventor: Kiyotaka Ohara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1364 days.

(21) Appl. No.: 11/341,647

(22) Filed: Jan. 30, 2006

(65) Prior Publication Data

US 2006/0170965 A1    Aug. 3, 2006

(30) Foreign Application Priority Data

Jan. 31, 2005 (JP) .................................. 2005-023948

(51) Int. Cl.
*H04L 29/06* (2006.01)

(52) U.S. Cl.
USPC ........... 713/165; 713/167; 713/168; 713/189; 726/27; 726/28; 726/29; 726/30; 709/203; 709/225; 715/241; 715/242; 715/243

(58) Field of Classification Search ......... 713/189–194, 713/164, 165, 167–168; 709/203, 225; 380/277; 715/241–243; 726/27–30
See application file for complete search history.

(56) References Cited

U.S. PATENT DOCUMENTS

| | | | | |
|---|---|---|---|---|
| 5,524,195 A | * | 6/1996 | Clanton et al. ................... | 725/61 |
| 5,734,898 A | * | 3/1998 | He ....................................... | 1/1 |
| 5,969,714 A | * | 10/1999 | Butcher ......................... | 715/719 |
| 6,032,189 A | * | 2/2000 | Jinzenji et al. ................. | 709/235 |
| 6,400,466 B1 | * | 6/2002 | Yamazaki et al. ............. | 358/1.6 |
| 2003/0037068 A1 | | 2/2003 | Thomas et al. | |
| 2003/0195767 A1 | * | 10/2003 | Hartman et al. ................... | 705/1 |
| 2004/0078472 A1 | * | 4/2004 | Mizutome et al. ............ | 709/227 |
| 2004/0179811 A1 | * | 9/2004 | Kikkawa et al. ................ | 386/46 |
| 2004/0204145 A1 | * | 10/2004 | Nagatomo ..................... | 455/566 |
| 2007/0115489 A1 | * | 5/2007 | Yorimoto et al. ............ | 358/1.13 |
| 2009/0248921 A1 | * | 10/2009 | Kim ............................... | 710/53 |

FOREIGN PATENT DOCUMENTS

| | | |
|---|---|---|
| CN | 1419785 A | 5/2003 |
| JP | H08-265475 A | 10/1996 |
| JP | H09-153913 A | 6/1997 |
| JP | H10-042086 A | 2/1998 |
| JP | 20027417 | 1/2002 |
| WO | 0176249 A1 | 10/2001 |

OTHER PUBLICATIONS

Hao-Hua et. al, A secure Multicast Protocol with Copyright Protection, Apr. 2002, ACM, vol. 32, No. 2.*

Hoa-Hua et. al, A secure Multicast Protocol with Copyright Protection, Apr. 2002, ACM, vol. 32, No. 2.*

(Continued)

*Primary Examiner* — Taghi Arani
*Assistant Examiner* — Josnel Jeudy
(74) *Attorney, Agent, or Firm* — Baker Botts L.L.P.

(57) ABSTRACT

According to an aspect of the invention, a content providing system is provided that includes a client device configured to receive contents and a server connected to the client device that provides contents to the client device. The client device may instruct the server to suspend the providing of contents, instruct the server how to handle unoffered contents after it instructs the server to suspend the providing of contents, and subsequently instruct the server to restart the providing of contents. When the server is instructed to suspend the providing of contents by the client device, the server may be instructed by the client device to handle the unoffered contents by sequentially accumulating those contents. The server also may be instructed to discard one of the accumulated contents or to provide one of the accumulated contents to the client device.

19 Claims, 22 Drawing Sheets

OTHER PUBLICATIONS

Japanese Patent Office, Notification of Reasons of Rejection for Patent Application No. JP 2005-023948, dispatched Nov. 11, 2008. (counterpart of above-captioned U.S. patent application.).

State Intellectual Property Office, Notification of First Office Action for Chinese Patent Appl'n. No. 2006100028483 (counterpart to above-captioned U.S. patent application), dated Dec. 14, 2007.

* cited by examiner

| PollURL | PollID | INTERVAL | SERVICE NAME | STATUS |
|---|---|---|---|---|
| http://*/* | PI0070 | 5 minutes | XX extra edition service | Suspend |
| http://*/* | QQR998 | 10 minutes | ZZ newspaper | Running |
| http://*/* | 54800624 | 60 minutes | YY newspaper | Running |
| http://*/* | zxcvb004009 | 10 minutes | QQIT newspaper | Running |

FIG. 7

| PollURL | Status | Folder | Status | Date | Others |
|---|---|---|---|---|---|
| PI0070 | Suspend | ¥¥xx¥PI0070 | Accumulate | 2004/12/30 15:00:00 | Japanese version |
| QQR998 | Running | ¥¥xx¥PI9019 | ---- | ---- | Japanese version |
| 54800624 | Suspend | ¥¥xx¥PI7890 | Discard | User Instruction | English version |
| zxcvb0004009 | Running | ¥¥xx¥PI4281 | ---- | ---- | Japanese version |

FIG.18

SYSTEM, SERVER, AND DEVICE FOR PROVIDING CONTENTS

CROSS-REFERENCE TO RELATED APPLICATION

This application claims priority under 35 U.S.C. §119 from Japanese Patent Application No. 2005-023948, filed on Jan. 31, 2005. The entire subject matter of the application is incorporated herein by reference.

BACKGROUND

1. Technical Field

Aspects of the present invention relate to a content providing system in which contents are provided from a server to a client device.

2. Description of Related Art

Content providing systems for providing contents from a server to a client device have been widely used. An example of a content providing system is disclosed in Japanese Patent Provisional Publication No. 2002-07417 (hereafter, referred to as JP 2002-07417A). In the system disclosed in JP 2002-07417A, a user is able to suspend providing of contents by inputting a suspend instruction through the client device, and is able to restart the providing of contents by inputting a restart instruction through the client device. By this configuration, the user is able to obtain contents from the server at a desired time.

However, the system disclosed in JP 2002-07417A has a drawback that all of unoffered contents, which are contents not provided for the client device while the server is instructed to suspend the providing of contents, are provided for the user (the client device) regardless of whether the user wants to receive the unoffered contents. If the contents to be provided for the user relates to news, the user may not want to receive the unoffered contents because the news (i.e., unoffered contents) may decline in value when the providing of contents is restarted.

SUMMARY

Aspects of the present invention are advantageous in that at least one of a content providing system, a server and a client device configured to provide contents in a manner as desired by a user is provided.

BRIEF DESCRIPTION OF THE ACCOMPANYING DRAWINGS

Figure 4A:
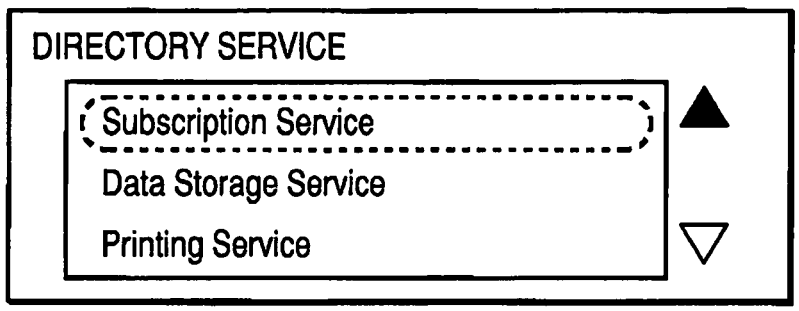
Figure 4B:
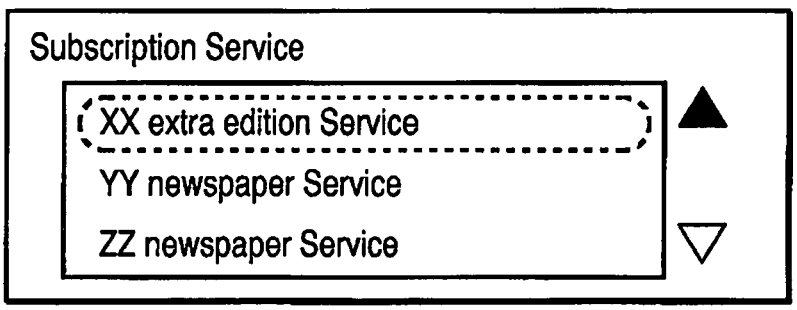
Figure 4C:
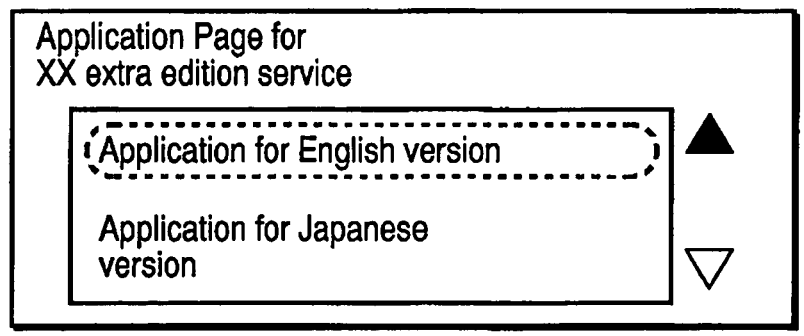
Figure 5:
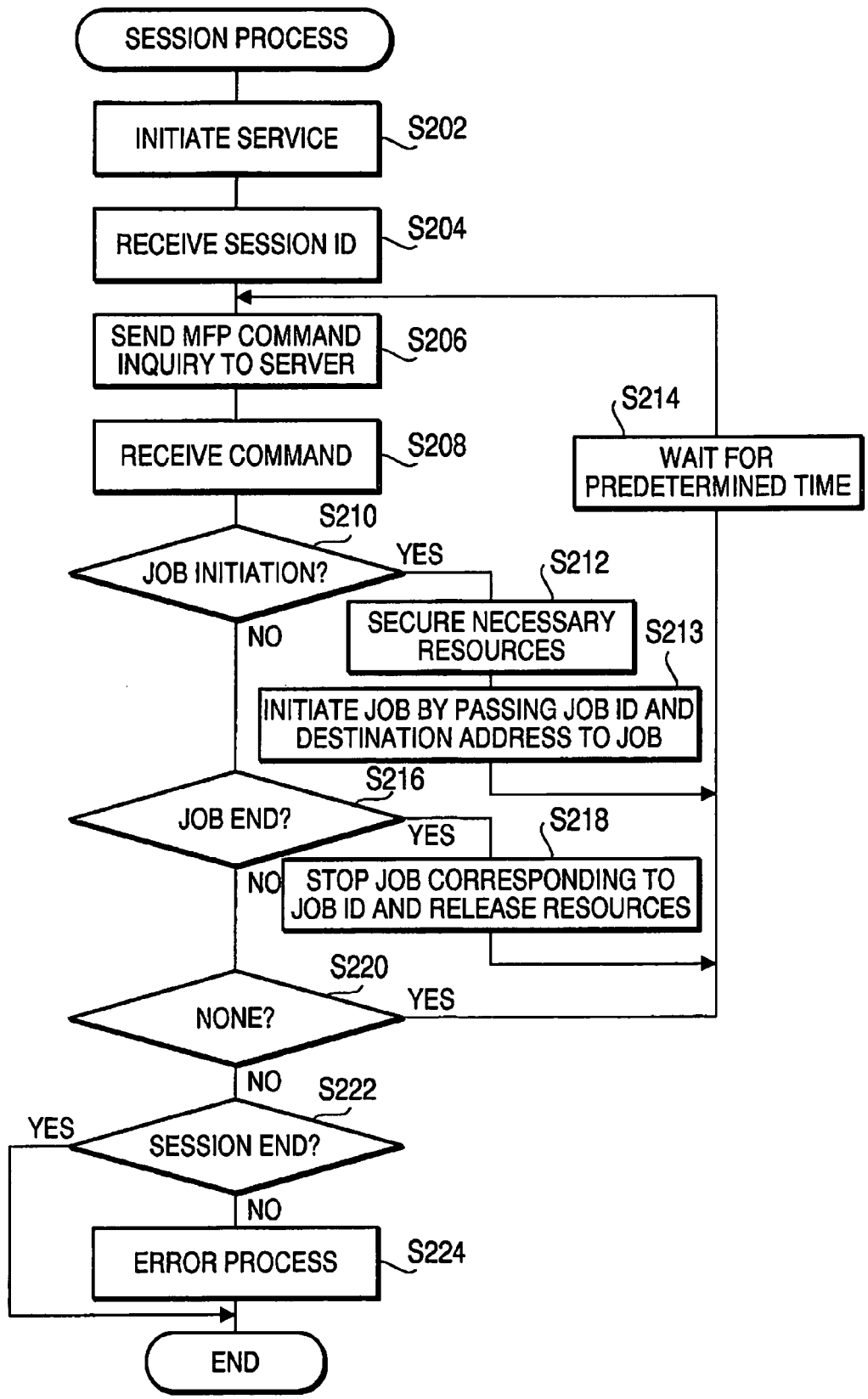

FIG. 4A shows an example of a category selection screen.
FIG. 4B shows an example of a service selection screen.
FIG. 4C shows an example of a parameter input screen.
FIG. 5 is a flowchart illustrating a session process executed under control of the control unit of the MFP.

Figure 6:
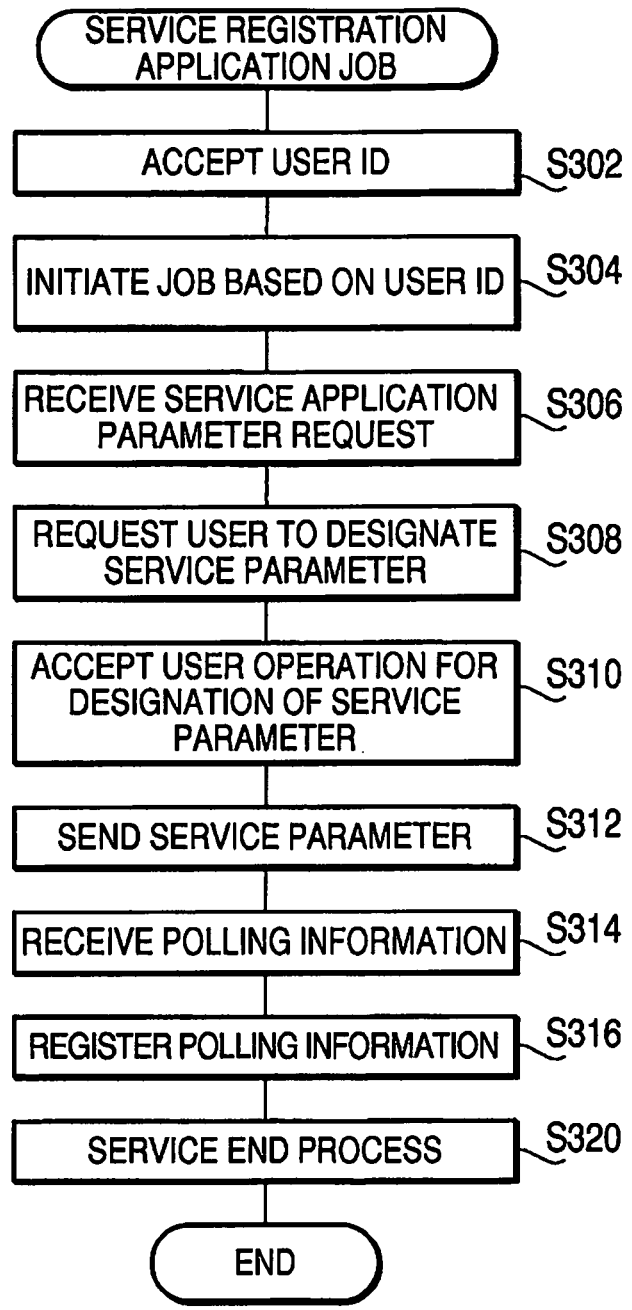

FIG. 6 is a flowchart illustrating a service registration application job executed under control of the control unit of the MFP.

FIG. 7 shows an example of a data structure of polling management information stored in the MFP.

Figure 8:
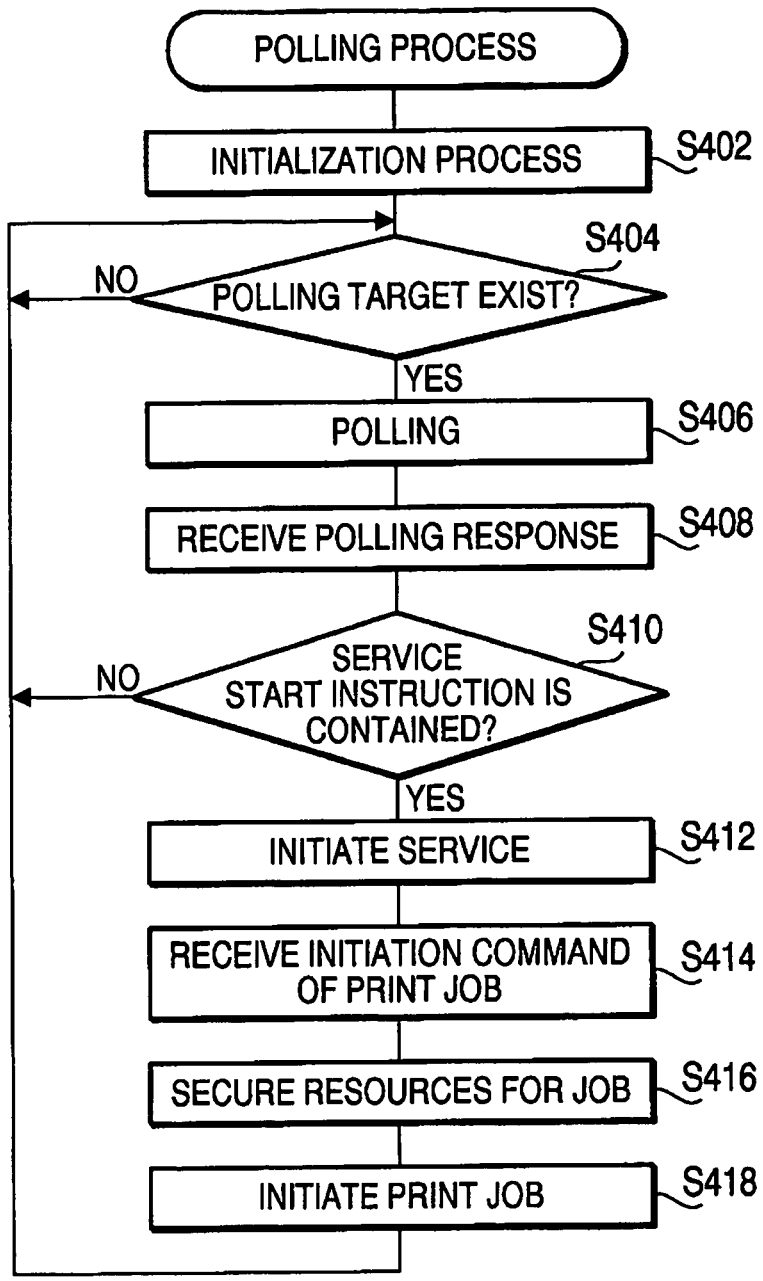

FIG. 8 is a flowchart illustrating a polling process executed under control of the control unit of the MFP.

Figure 9:
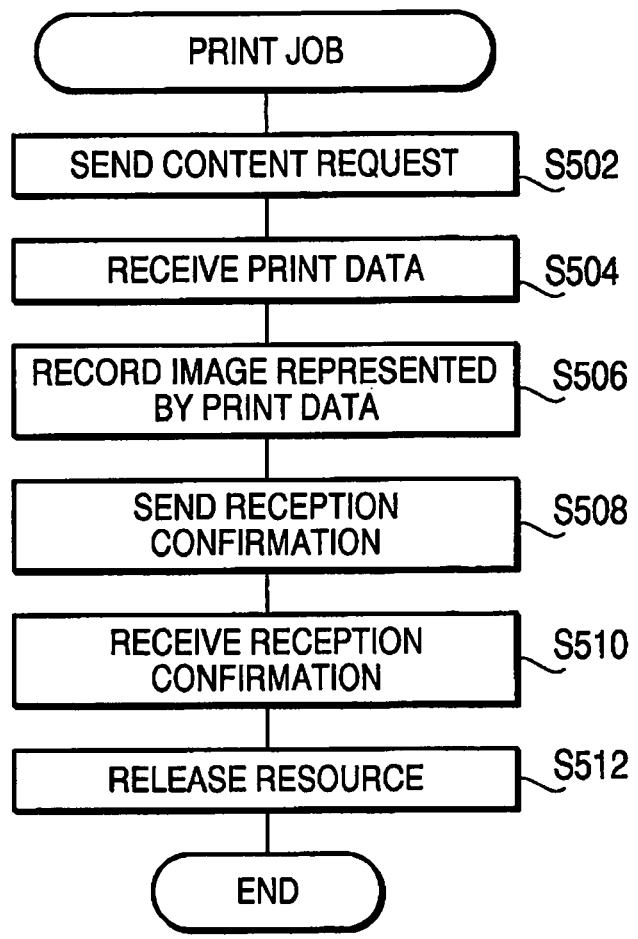

FIG. 9 is a flowchart illustrating a print job executed under control of the control unit of the MFP.

Figure 10:
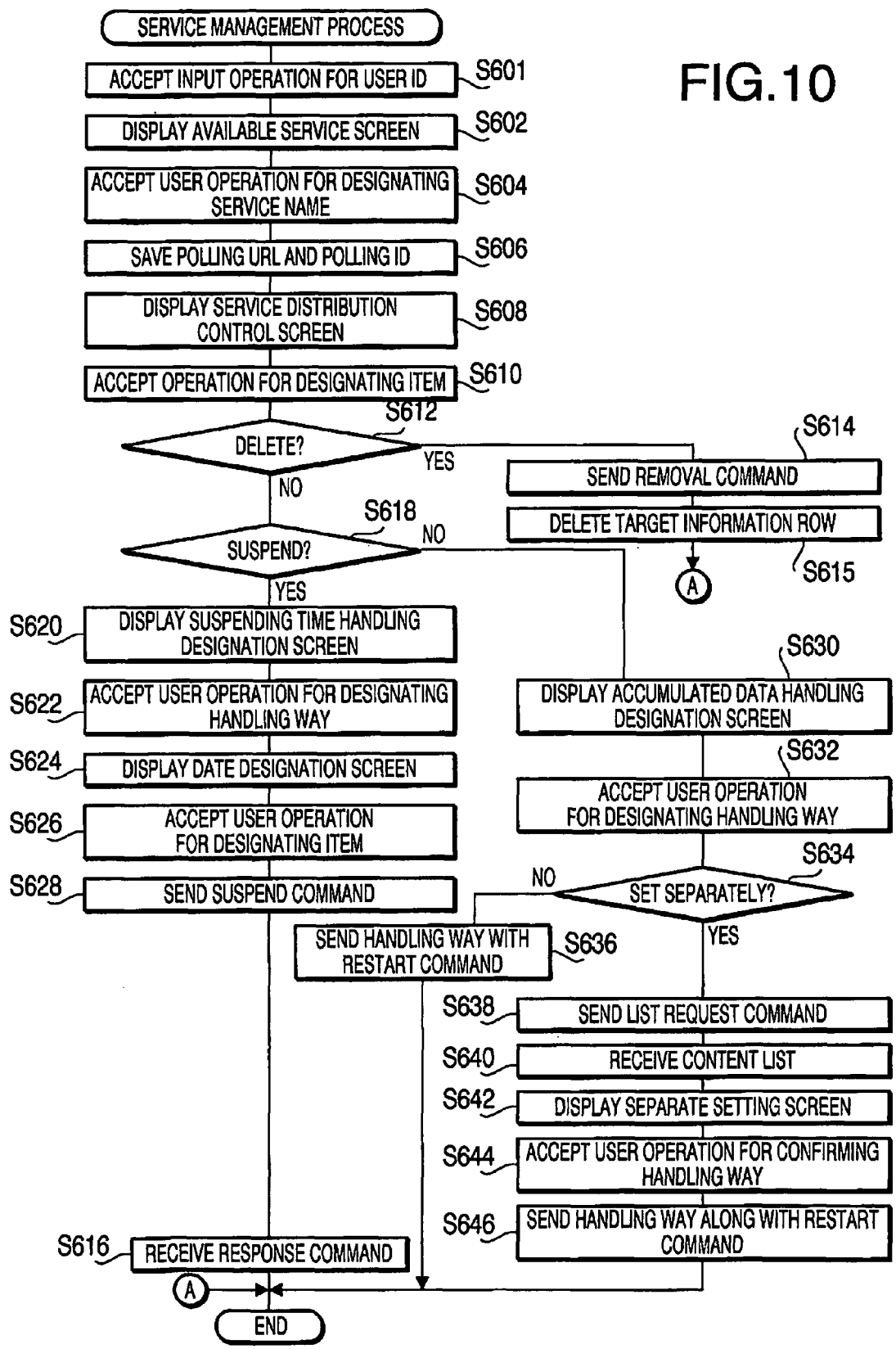

FIG. 10 is a flowchart illustrating a service management process to be executed under control of the control unit of the MFP.

Figure 11A:
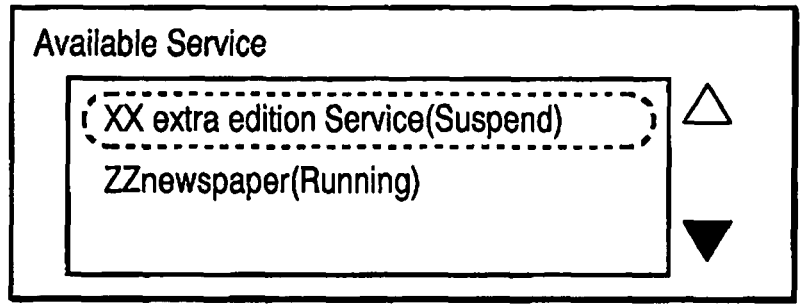
Figure 11B:
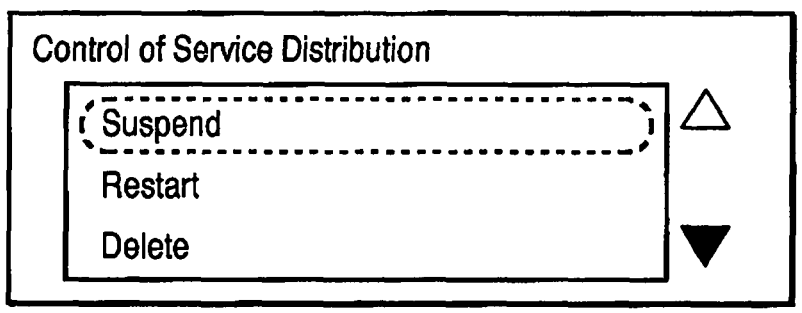
Figure 11C:
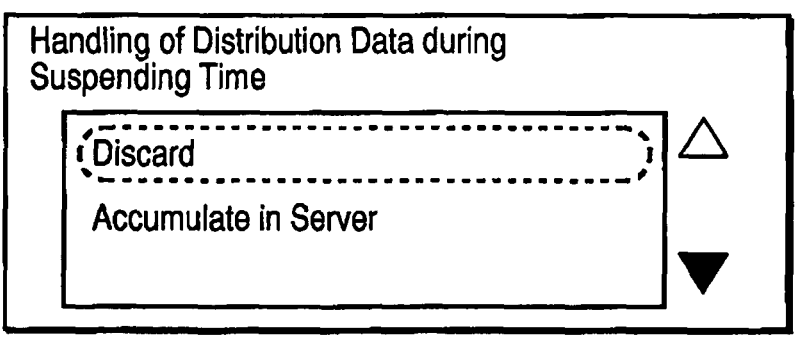

FIG. 11A shows an example of an available service screen.
FIG. 11B shows an example of a service distribution control screen.
FIG. 11C shows an example of a suspending time handling designation screen.

Figure 12:
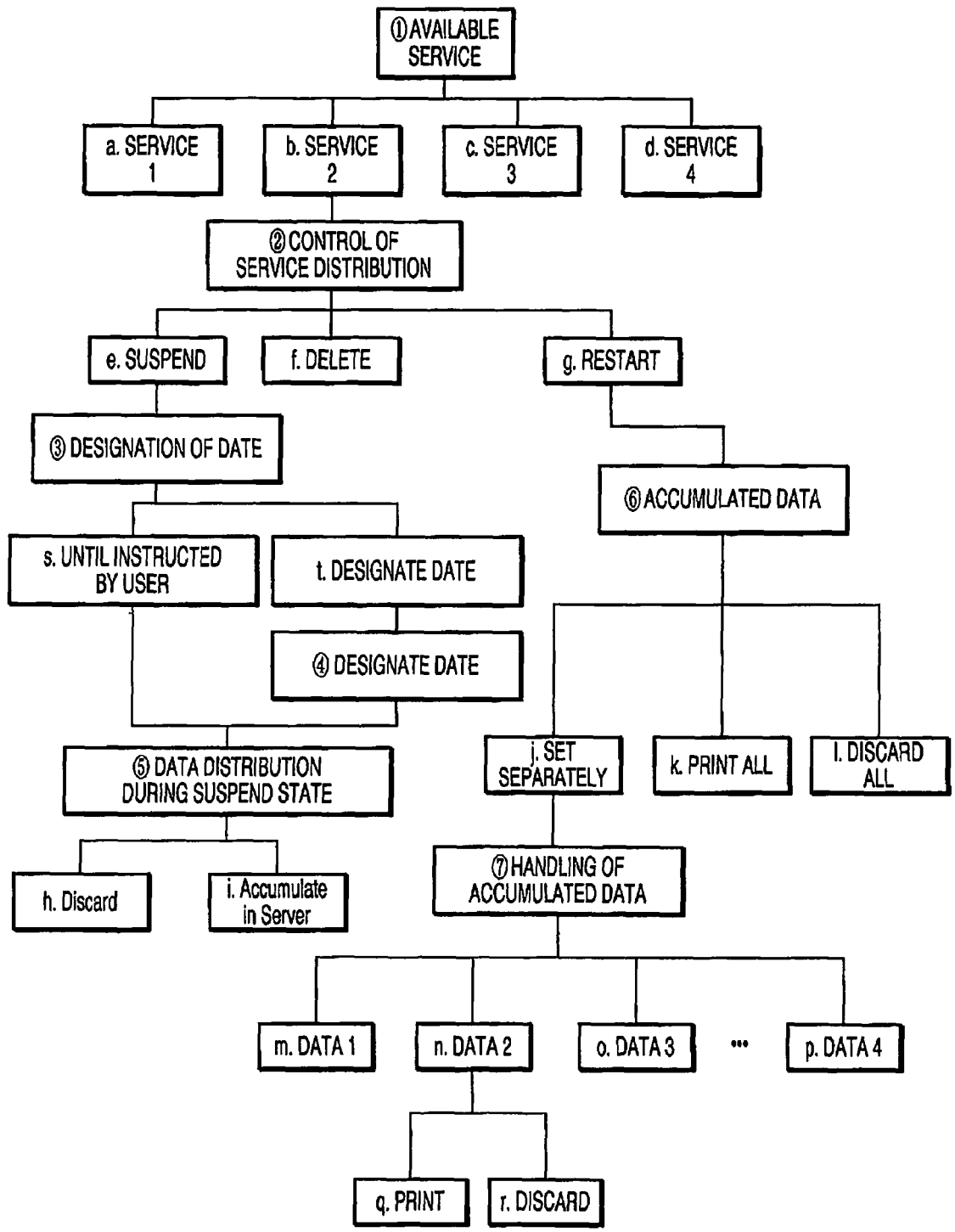

FIG. 12 shows a hierarchical menu structure of the available menu setting screen.

Figure 13A:
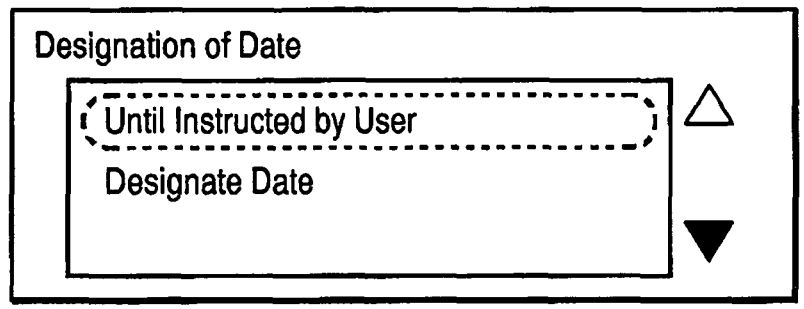
Figure 13B:
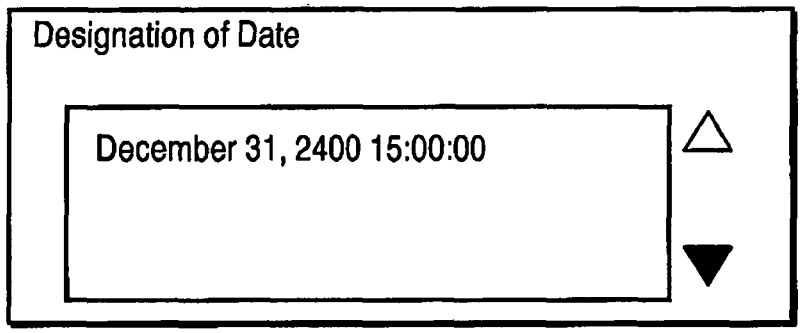
Figure 14A:
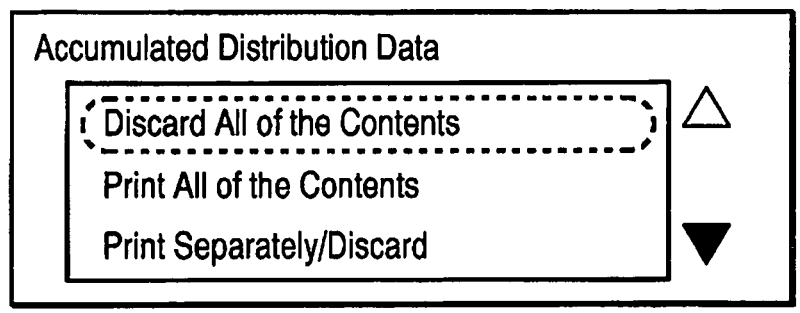
Figure 14B:
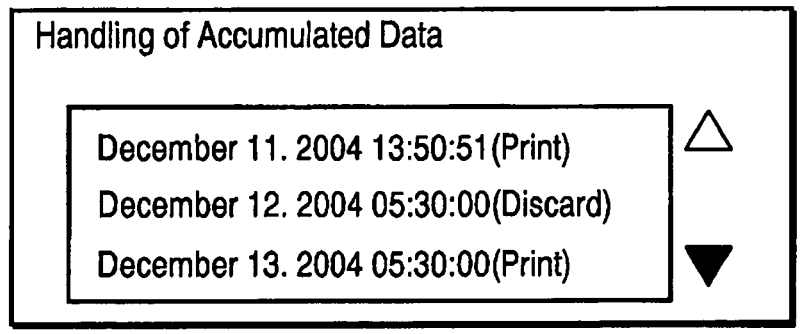

FIG. 13A is an example of a date designation screen.
FIG. 13B is an example of a date input screen.
FIG. 14A shows an example of an accumulated data handling designation screen.
FIG. 14B shows an example of a separate setting screen.

Figure 15:
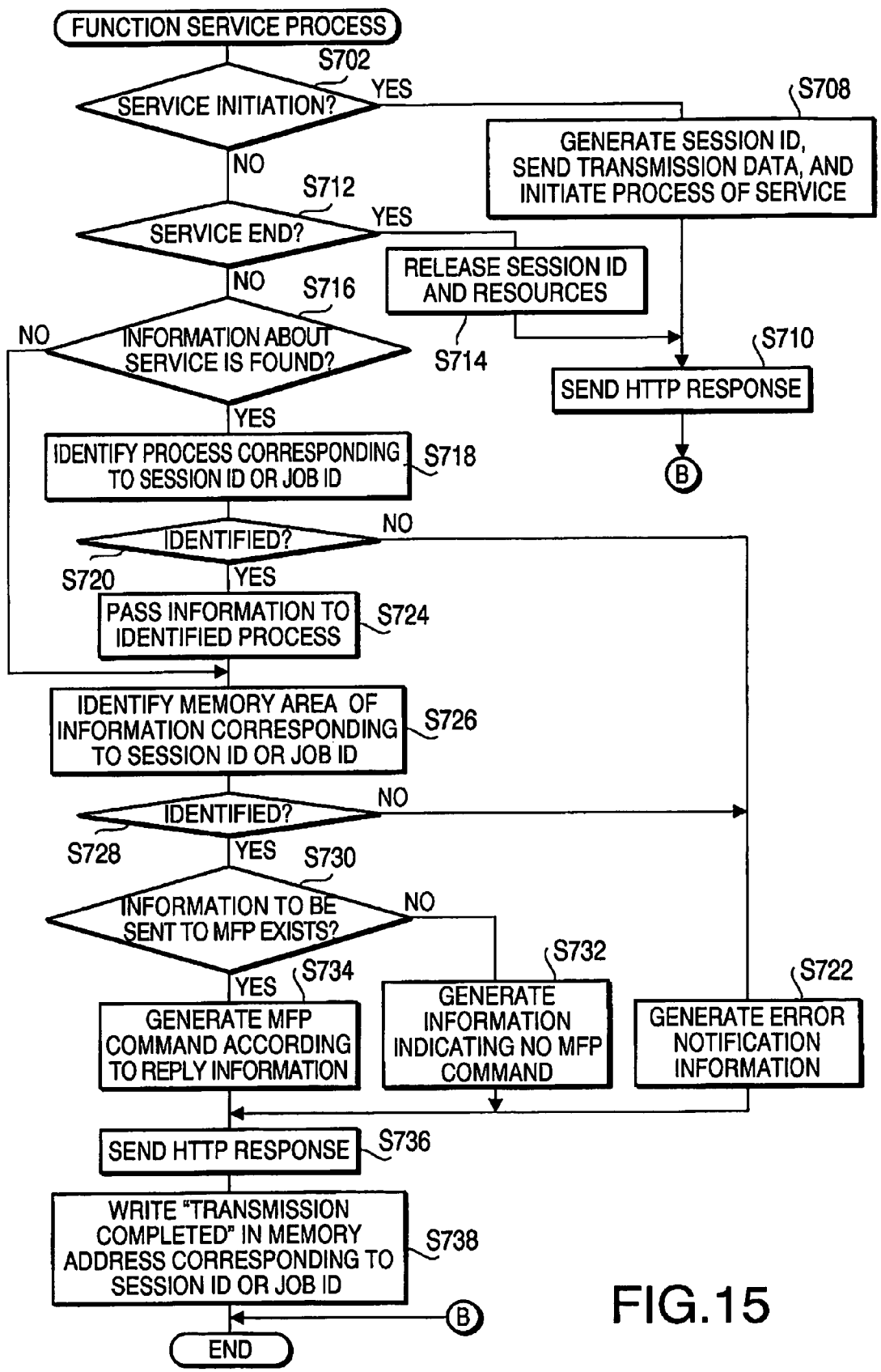

FIG. 15 is a flowchart illustrating a function server process executed under control of a control unit of a function server provided in the content providing system.

Figure 16:
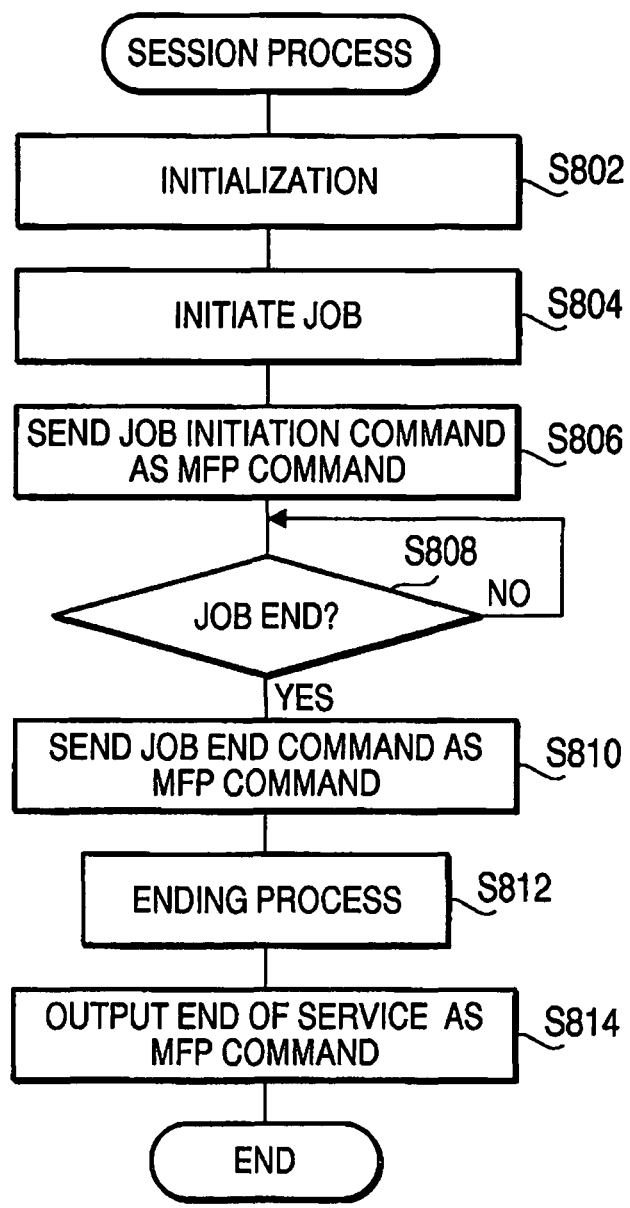

FIG. 16 is a flowchart illustrating a server side session process executed under control of the control unit of the function server.

Figure 17:
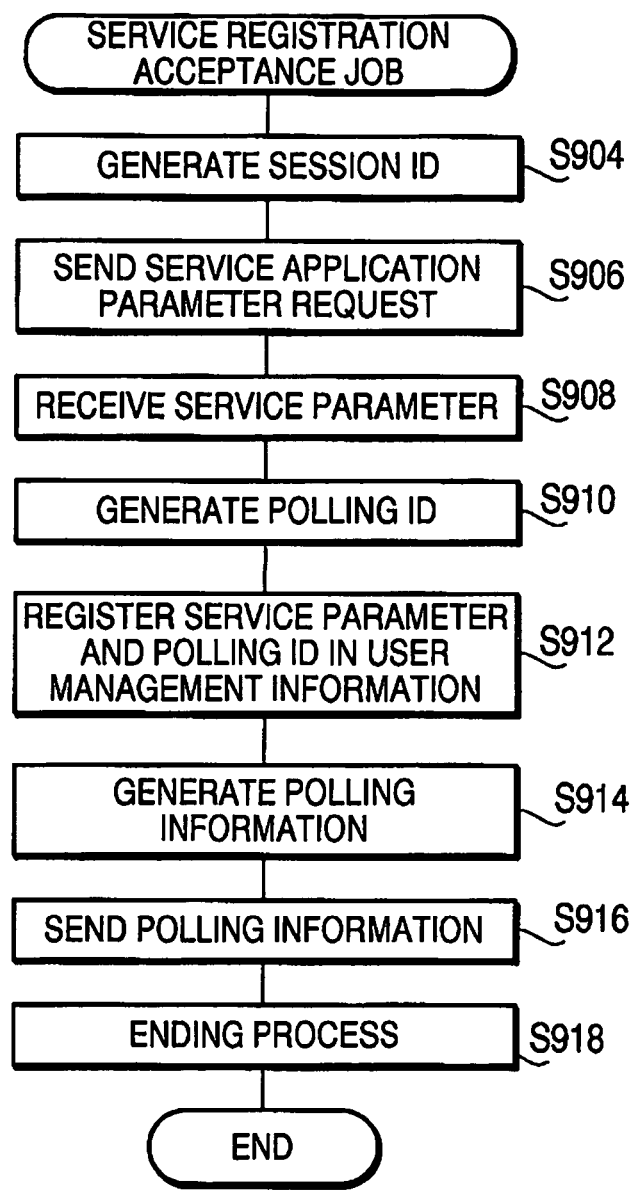

FIG. 17 is a flowchart illustrating a service registration acceptance job executed under control of the control unit of the function server.

FIG. 18 is an example of a data structure of user management information.

Figure 19:
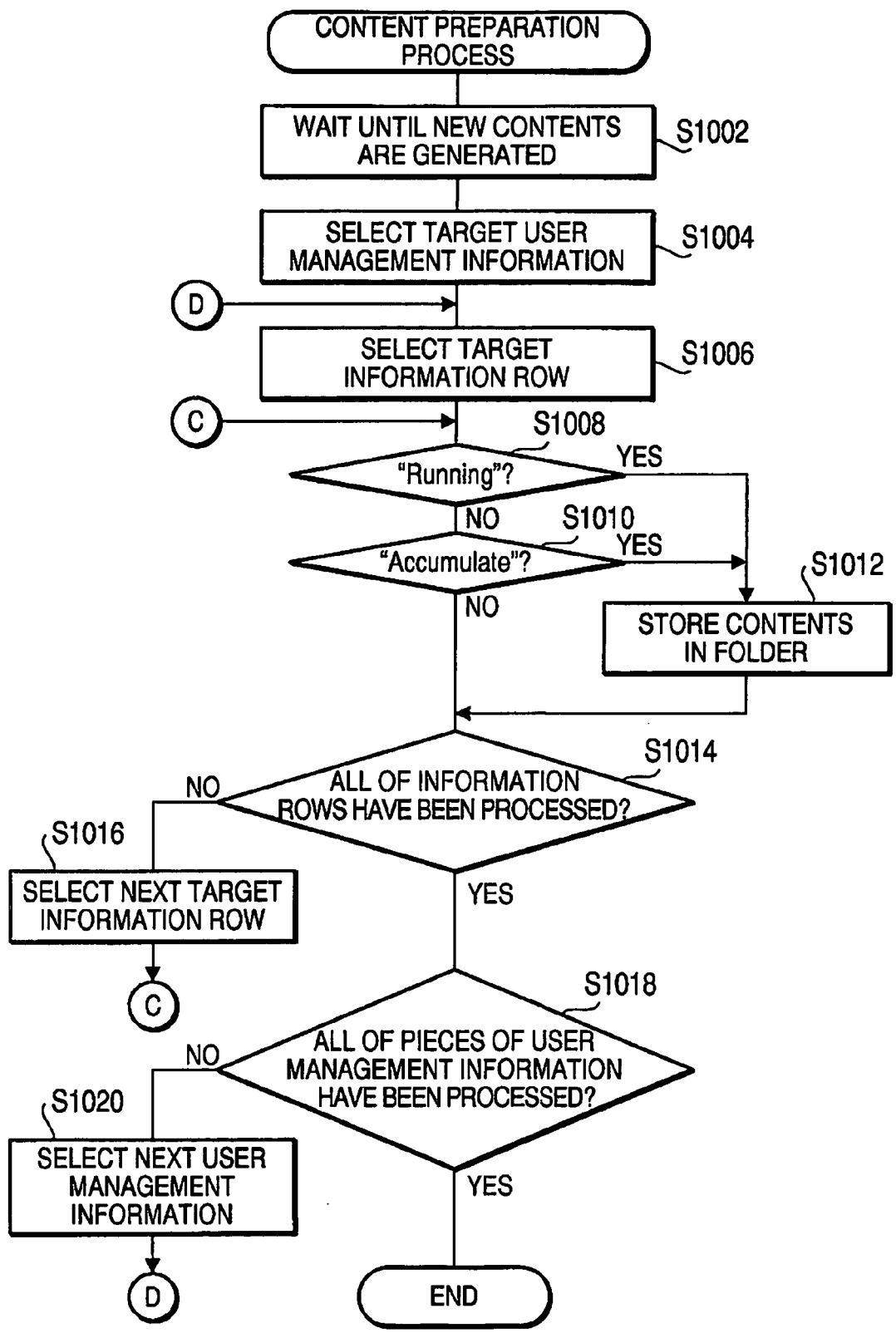

FIG. 19 is a flowchart illustrating a content preparation process to be executed under control of the control unit of the function server.

Figure 20:
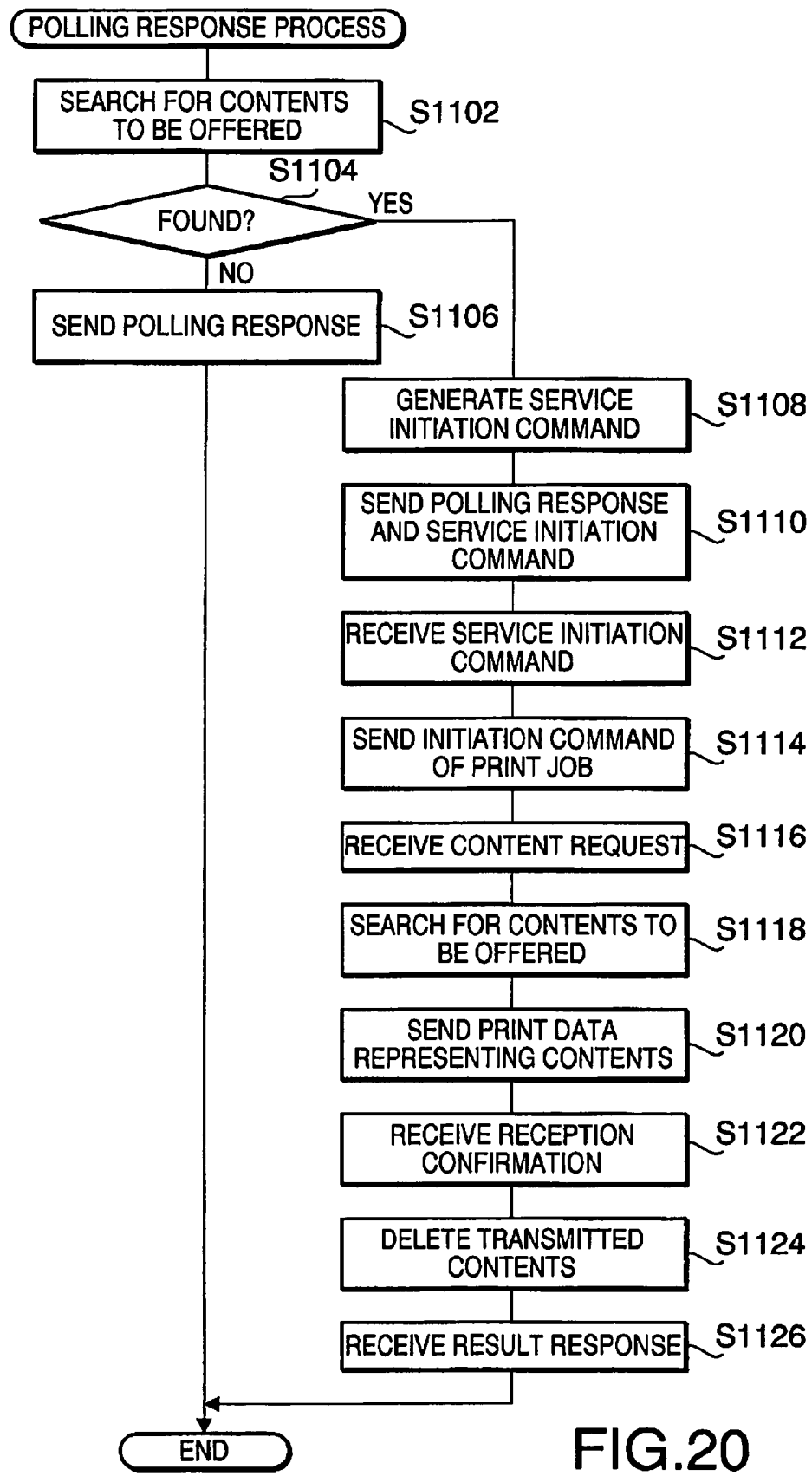

FIG. 20 is a flowchart illustrating a polling response process to be executed under control of the control unit of the function server.

Figure 21:
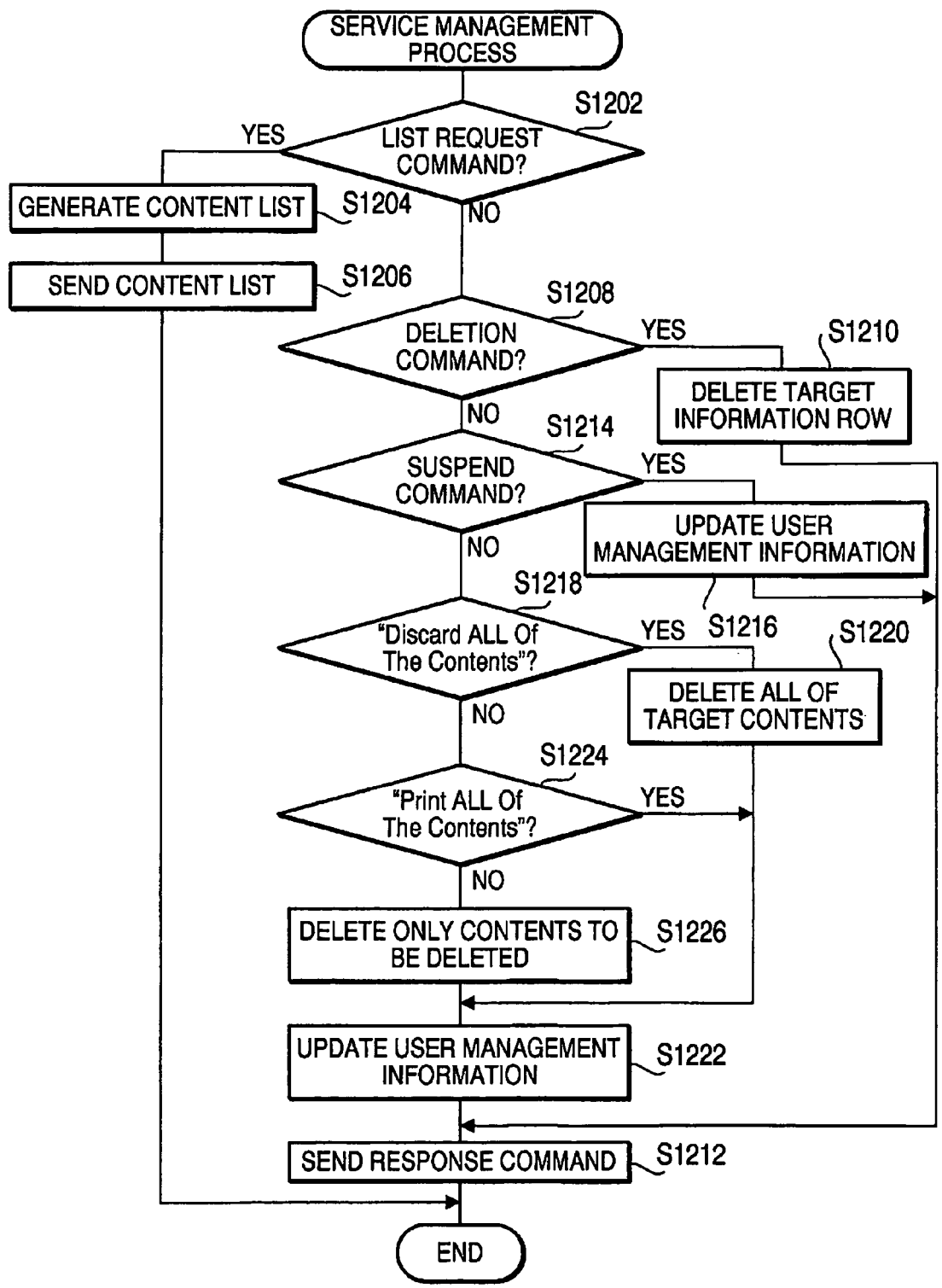

FIG. 21 is a server side service management process to be executed under control of the control unit of the function server.

Figure 22:
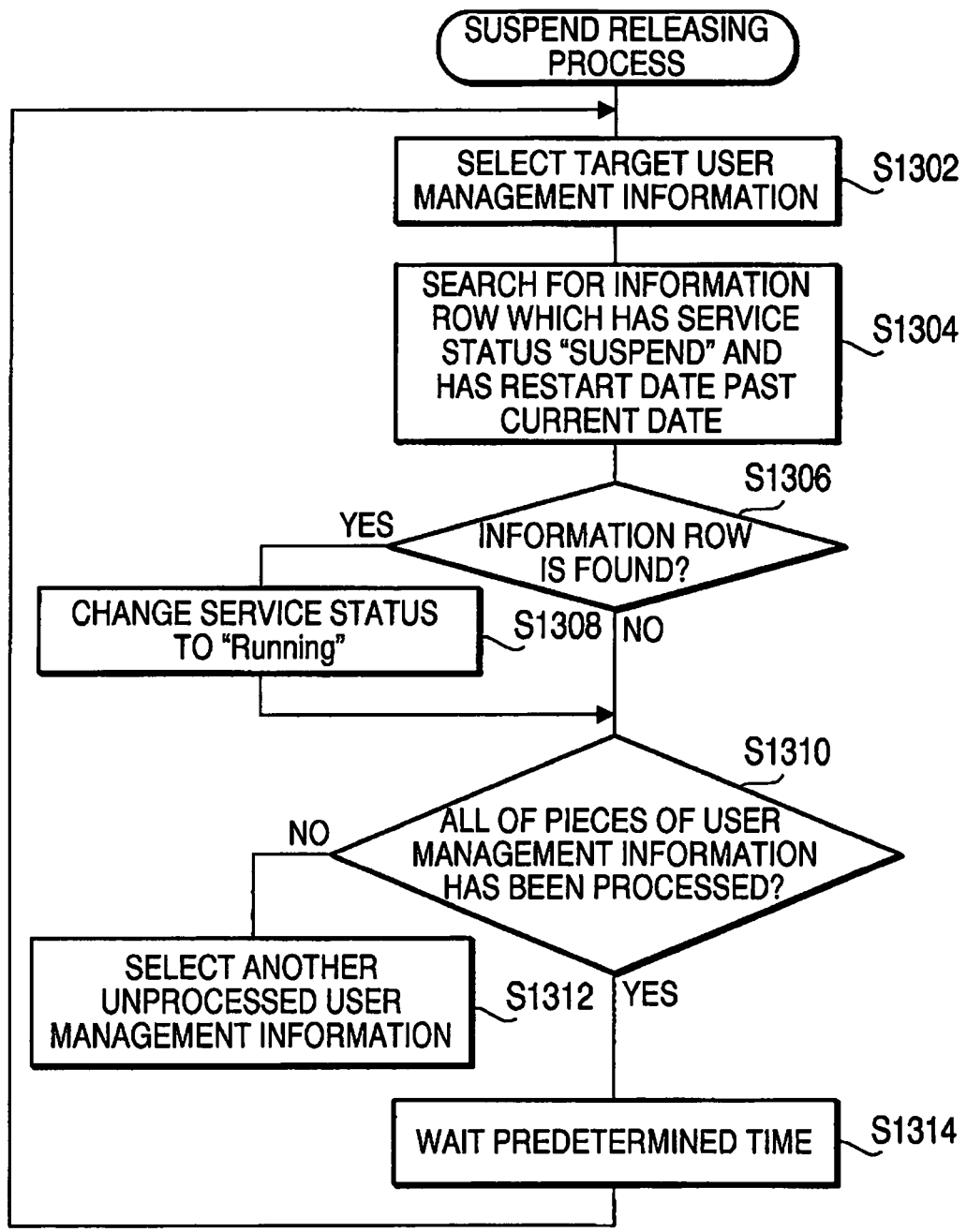

FIG. 22 is a flowchart illustrating a suspend releasing process to be executed under control of the control unit of the MFP.

DETAILED DESCRIPTION

General Overview

According to an aspect of the invention, there is provided a content providing system, which includes a client device configured to receive contents, and a server connected to the client device to provided contents for the client device. The client device includes a suspend instruction issuing unit that instructs the server to suspend providing of contents, a handling way designation unit that designates a handling way defining how to handle unoffered contents which are contents not provided for the client device to instruct the server by the suspend instruction issuing unit, a handling way notifying unit that notifies the server of the handling way designated by the handling way designation unit, and a restart instruction issuing unit that instructs the server to restart the providing of contents after the suspend instruction issuing unit instructs the server to suspend the providing of contents. The server includes a content providing unit that provides contents for the client device, a suspending unit that suspends the providing of contents by the content providing unit if the server is instructed to suspend the providing of contents by the suspend instruction issuing unit of the client device, a restart unit that restarts the providing of contents by the content providing unit if the server is instructed to restart the providing of contents by the restart instruction issuing unit of the client device after the providing of contents is suspended by the suspending unit, and a notification processing unit that processes the unoffered contents in accordance with the handling way notified by the handling way notification unit of the client device.

Since the unoffered contents are handled by the server in accordance with the handling way designated by the user, it is possible to provided the unoffered contents in a manner as desired by the user.

Optionally, the handling way notifying unit may notify the server of the handling way when the suspend instruction issuing unit instructs the server to suspend the providing of contents.

Alternatively, the handling way notifying unit notify the server of the handling way when the restart instruction issuing unit instructs the server to restart the providing of contents.

Optionally, the handling way designation unit allows the user to select one of an instruction requesting for the unoffered contents, an instruction not requesting for the unoffered contents and an instruction requesting for the unoffered contents selectively, as the handling way to be notified to the server.

Still optionally, the restart instruction issuing unit of the client device may notify the server of a restart date for restating the providing of contents when the suspend instruction issuing unit instructs the server to suspend the providing of contents. In this case, the restart unit of the server may control the content providing unit to restart the providing of contents when a current date reaches the restart date.

Still optionally, the client device may include a printing unit that prints the contents provided by the server on a recording medium.

Still optionally, the suspend instruction issuing unit may allow the user to input a suspend instruction, and may instruct the server to suspend the providing of contents when the suspend instruction is inputted.

Still optionally, the restart instruction issuing unit may allow the user to input a restart instruction, and may instruct the server to restart the providing of contents when the restart instruction is inputted.

Still optionally, the providing of contents from the server to the client device may be performed continuously.

According to another aspect of the invention, there is provided a client device connected to a server to receive contents from the server. The client device includes a printing unit that prints contents provided by the server on a recording medium, a suspend instruction issuing unit that allows a user to input a suspend instruction, and instructs the server to suspend providing of contents when the suspend command is inputted, a handling way designation unit that designates a handling way defining how to handle unoffered contents which are contents not provided for the client device to instruct the server by the suspend instruction issuing unit, a handling way notifying unit that notifies the server of the handling way designated by the handling way designation unit, and a restart instruction issuing unit that allows the user to input a restart instruction, and instructs the server to restart the providing of contents when the restart instruction is inputted after the suspend instruction issuing unit instructs the server to suspend the providing of contents.

Since the unoffered contents are handled by the server in accordance with the handling way designated by the user, it is possible to provided the unoffered contents in a manner as desired by the user.

According to another aspect of the invention, there is provided a server connected to a client device to provided contents for the client device. The server includes a content providing unit that provides contents for the client device, a suspending unit that suspends providing of contents by the content providing unit if the server is instructed to suspend the providing of contents by the client device, a restart unit that restarts the providing of contents by the content providing unit if the server is instructed to restart the providing of contents by the client device after the providing of contents is suspended by the suspending unit, and a notification processing unit that processes unoffered contents, which are contents not provided for the client device, in accordance with a handling instruction provided by the client device.

Since the unoffered contents are handled by the server in accordance with the handling way designated by the user, it is possible to provided the unoffered contents in a manner as desired by the user.

According to another aspect of the invention, there is provided a computer program comprising computer readable instructions that cause a client device which receives contents from a server to print contents provided by the server on a recording medium, instruct the server to suspend providing of contents when a user operation for suspending the providing of contents is accepted, designate a handling way defining how to handle unoffered contents which are contents not provided for the client device, notify the server of the handling way designated by the handling way designation unit, and instruct the server to restart the providing of contents when a user operation for restating the providing of contents is accepted after the server is instructed to suspend the providing of contents.

According to another aspect of the invention, there is provided a computer program comprising computer readable instructions that cause a server which provides contents for a client device to provide contents for the client device, suspend the providing of contents if the server is instructed to suspend the providing of contents by the client device, restart the providing of contents if the server is instructed to restart the providing of contents by the client device after the providing of contents is suspended, and process unoffered contents, which are contents not provided for the client device, in accordance with a handling instruction provided by the client device.

The device and method according to the present invention can be realized when appropriate programs are provided and executed by a computer. Such programs may be stored in recording medium such as a flexible disk, CD-ROM, memory cards and the like and distributed. Alternatively or optionally, such programs can be distributed through networks such as the Internet.

ILLUSTRATIVE EMBODIMENTS

Hereafter, an illustrative embodiment according to the invention will be described with reference to the accompanying drawings.

Figure 1:
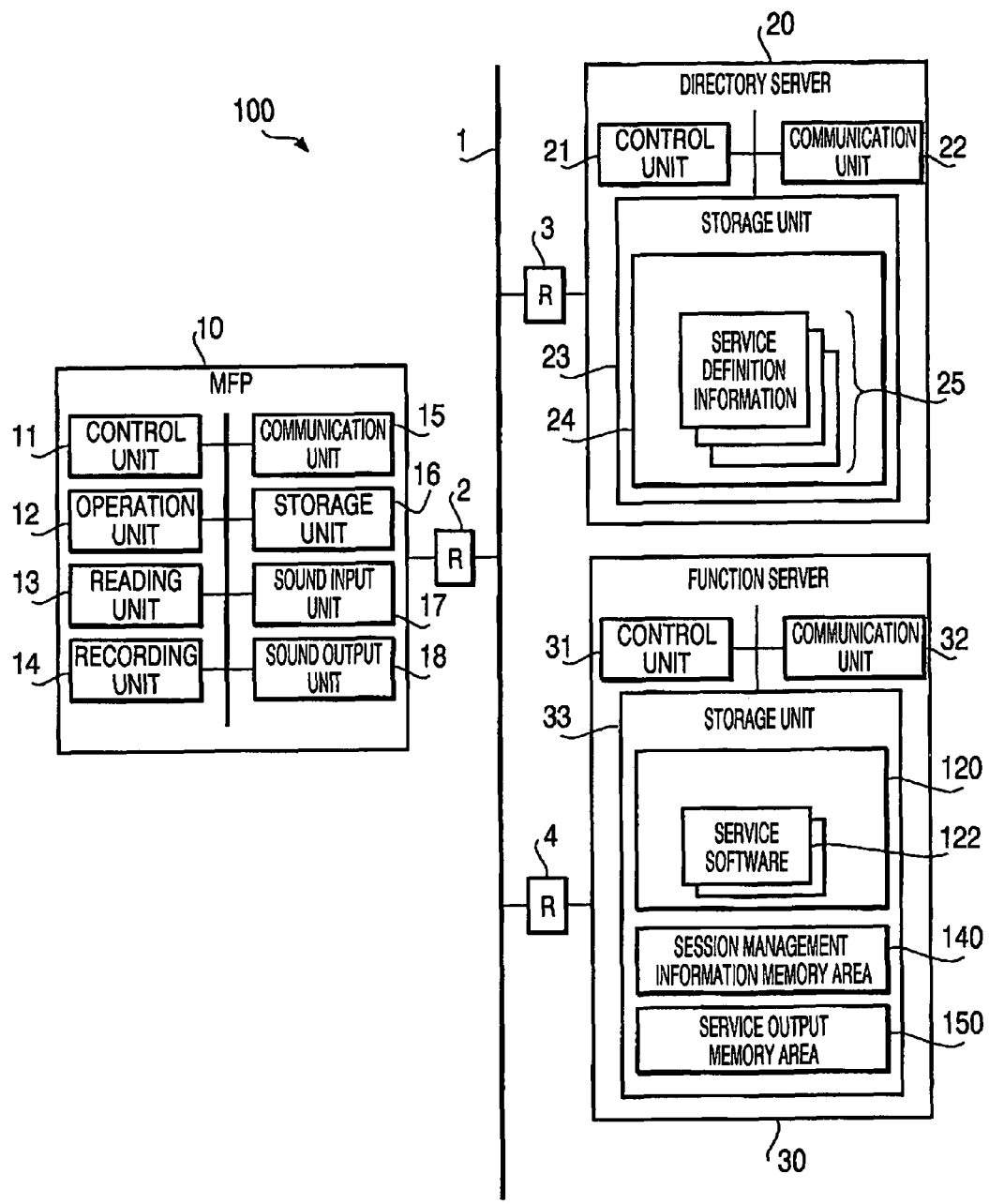
FIG. 1 is a block diagram of a content providing system according to an embodiment of the invention.

FIG. 1 is a block diagram of a content providing system 100 according to an embodiment of the invention. As shown in FIG. 1, the content providing system 100 includes a MFP (multifunction peripheral) 10, a directory server 20 and a function server 30, which are connected to a network 1 via respective routers 2, 3 and 4. The network 1 is, for example, a WAN (wide area network).

The MFP 10 includes a control unit 11, an operation unit 12, a reading unit 13, a recording unit 14, a communication unit 15, a storage unit 16, a sound input unit 17 and a sound output unit 18. The control unit 11 includes a CPU, a ROM and a RAM (not shown in FIG. 1), and the CPU executes programs stored in the ROM so as to control operations of the MFP 10.

Figure 2:
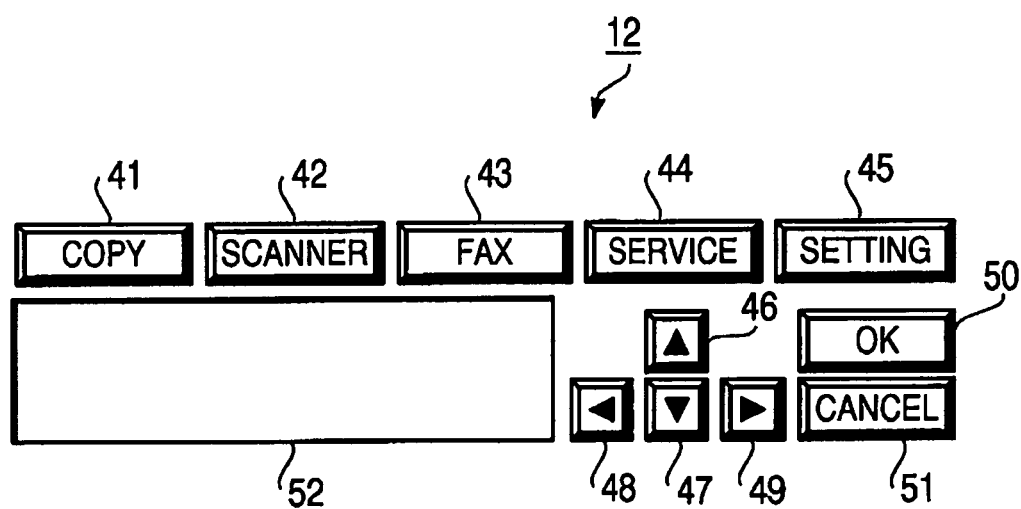
FIG. 2 shows an operation unit of an MFP provided in the content providing system.

As shown in FIG. 2, the operation unit 12 functioning as a user interface of the MFP 10 includes a copy key 41, a scanner key 42, a FAX key 43, a service key 44, a setting key 45, cursor keys 46 (up, down, left and right keys), an OK key 50, and a cancel key 51. The operation unit 12 further includes a display 52.

The reading unit 13 functioning as a scanner reads an image formed on (printed on) an original and generates image data corresponding to the read image. The recording unit 14 functioning as a printer forms an image on a sheet in accordance with image data. The communication unit 15 conducts data processing for the data communication with a node (e.g., the directory server 20 or the function server 30) on the network 1.

The storage unit 16 includes a non-volatile RAM in which various types of data is stored. The sound input unit 17 includes a microphone installed in a handset (not shown) of the MFP 10. The sound input unit 17 generates sound data (e.g. PCM data) representing the sound obtained by the microphone. The sound output unit 18 outputs sound via a speaker installed in the handset or a speaker installed in a main body of the MFP 10.

The directory server 20 includes a control unit 21, a communication unit 22 and a storage unit 23. The control unit 21 includes a CPU, a ROM and a RAM (not shown in FIG. 1), and the CPU executes programs stored in the ROM so as to control operations of the directory server 20. The communication unit 22 conducts data processing for the data communication with a node (e.g., the MFP 10) on the network 1. The storage unit 23 includes a hard disk drive (not shown in FIG. 1) in which varies types of data are stored. In the storage unit 23, a service definition information memory area 24 for storing service definition information 25 is provided.

The service definition information 25 is XML data described by an XML (extensible Markup Language). It is possible to display a service list including services that the function server 30 supports on a service selection screen which can be generated by use of the service definition information 25. For example, the service list includes service types and destination addresses (URL; Uniform Resource Locator) of services.

The function server 30 includes a control unit 31, a communication unit 32, and a storage unit 33. The control unit 31 includes a CPU, a ROM and a RAM (not shown in FIG. 1), and the CPU executes programs stored in the ROM so as to control operations of the function server 30. It should be noted that the control unit 31 of the function server 30 has considerably higher performance than that of the control unit 11 of the MFP 10, and therefore is able to execute processes that the MFP 10 is not able to execute.

The communication unit 32 conducts data processing for the data communication with a node (e.g., the MFP 10) on the network 1. The storage unit 33 includes a hard disk drive (not shown in FIG. 1) in which various types of data are stored. The storage unit 33 includes a service software memory area 120 for storing service software 122, a session management information memory area 140 for storing session management information (e.g., a session ID), and a service output memory area 150 for storing print data.

Figure 3:
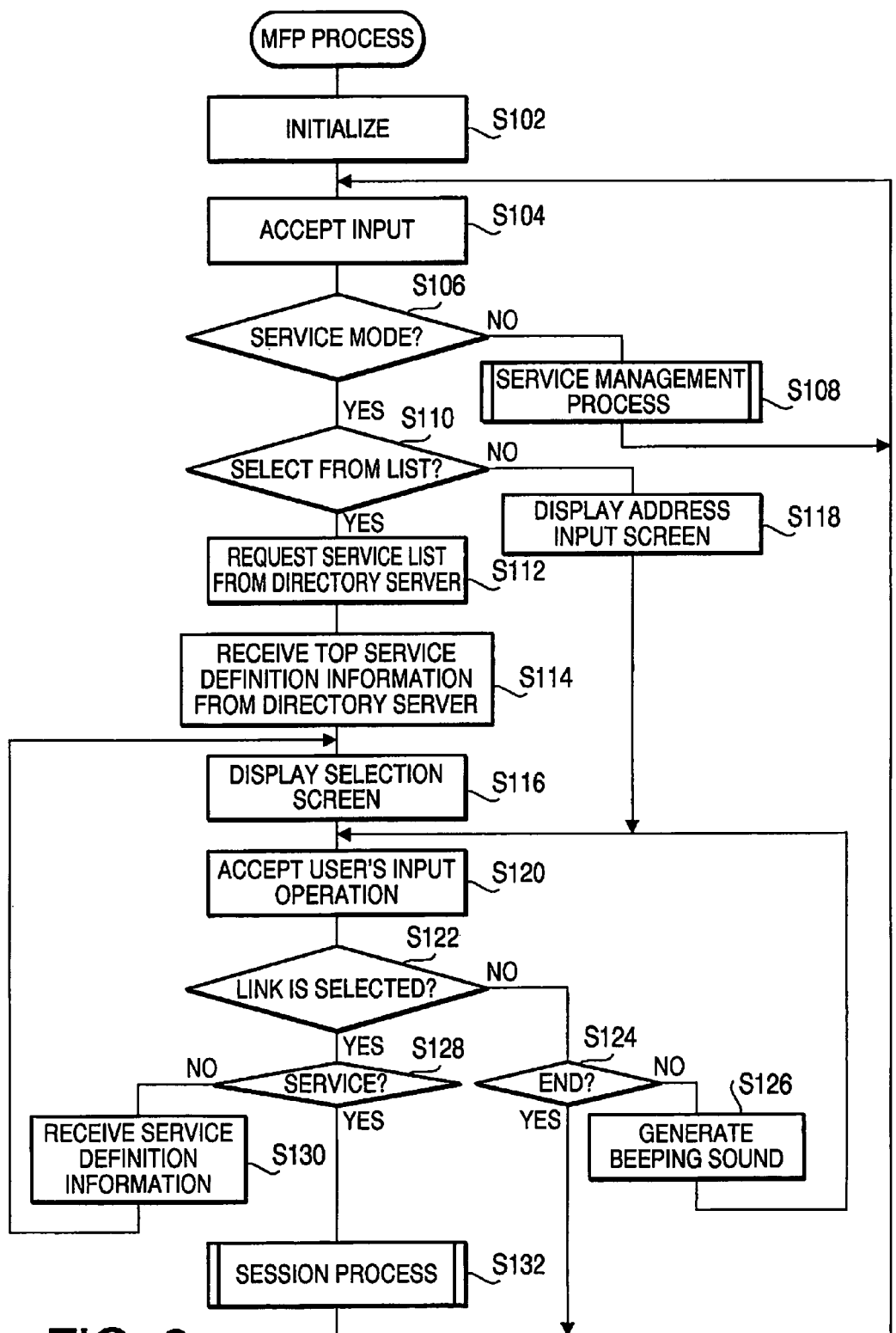
FIG. 3 is a flowchart illustrating a MFP process executed under control of a control unit of the MFP.

Hereafter, operations of the MFP 10 will be explained. FIG. 3 is a flowchart illustrating a MFP process which is executed under control of the control unit 11 of the MFP 10. The MFP process is initiated immediately when power of the MFP 10 is turned to ON.

First, in step S102, the control unit 11 executes an initializing process. Then, in step S104, the control unit 11 accepts an input. The input means a command for instructing the MFP 10 to execute a certain process. For example, the input is a key input by a user through the operation unit 12 or a command signal transmitted from an external computer via the network 1.

In step S106, the control unit 11 judges whether the user input instructs the MFP 10 to change to a service mode. For example, if the user operation is an operation of pressing the service key 44, the control unit 11 judges that the user input instructs the MFP 10 to change to a service mode. On the other hand, if the user operation is an operation of pressing the service key 44 for a relatively long time (e.g., two seconds), the control unit 11 judges that the user input instructs the MFP 10 to change to a service management mode. The service mode means an operation mode for requesting a service from the function server 30, and the service management mode means an operation mode for registering services to be provided to the MFP 10.

If the user input does not instruct the MFP 10 to change to the service mode, i.e., the user input instructs the MFP 10 to change to the service management mode (S106: NO), control proceeds to step S108 where a service management process is executed. Then, control returns to step S104.

If the user input instructs the MFP 10 to change to the service mode (S106: YES), control proceeds to step S110. In step S110, the control unit 11 displays a selection screen, requesting a user to decide whether the user selects a desirable service (to be requested to the function server 30) from a list or designates directly a URL of a destination of a desirable service, on the display 52. Then, the control unit 11 waits for a user input. If the user input is accepted, the control unit 11 judges whether a service to be requested from the function server 30 is to be selected from a service list (S110).

If it is judged in step S110 that a service to be requested from the function server 30 is to be selected form a service list (S110: YES), control proceeds to step S112 where the control unit 11 sends a request for a service list to the directory server 20. Specifically, in step S112, the control unit 11 requests the service list by sending an HTTP request based on HTTP (HyperText Transfer Protocol) 1.1 (hereafter, simply referred to as an HTTP request) to a destination address stored in the storage unit 16. After receiving the HTTP request from the MFP 10, the directory server 20 sends top service definition information 25 back to the MFP 10 as a HTTP response based on HTTP 1.1. The top service definition information 25 is used by the MFP 10 to display a category selection screen allowing a user to select one of service categories including "subscription service", "data storage service", "print service", and "copy application service".

After the MFP 10 receives the top service definition information in step S114, the control unit 11 generates a selection screen based on the received service definition information 25 and displays the selection screen on the display 52 (S116). Then, control proceeds to step S120.

When step S116 is executed after the top service definition information 25 is received by the MFP 10, a category selection screen shown in FIG. 4A is displayed on the display 52 of the MFP 10. Specifically, a character string "directory service" is displayed at the top of the screen as a display title, and character strings "subscription service", "data storage service" and "printing service" are displayed under the display title as selectable categories. Each item on the service selection screen has been associated with an ID of service definition information 25 corresponding to each category. By this configuration, when a selection of an item is confirmed by the user, service definition information 25 having the ID associated with the selected item is obtained from the directory server 20.

As shown in FIGS. 4A to 4C, the MFP 10 displays upward/downward arrows (triangles) on the right side on the display 52 to allow the user to scroll up or down the displayed items if all of the items can not be displayed on the display 52 simultaneously due to the limitations of the size of a display area.

If step S116 is executed after service definition information 25 different from top service definition information 25 (e.g., service definition information 25 regarding "subscription service") is received, a service selection screen shown, for example, in FIG. 4B is displayed on the display 52. Specifically, in the service selection screen, a character string "subscription service" is displayed at the top of the screen as a display title, and service names are displayed under the display title as selectable items. Each service is associated with an addressed of corresponding service definition information 25. If one of the items is selected by a user through the service selection screen, the MFP 10 requests a service of the selected item from the function server 30. The "subscription service" means a service where a user receives contents continuously (e.g., a user receives contents periodically in accordance with a predetermined schedule, or a user receives contents at irregular time intervals).

If it is judged in step S110 that a service to be requested from the function server 30 is not selected form a service list (S110: NO), control proceeds to step S118 where control unit 11 generates an address input screen for allowing a user to directly input a URL, and displays the address input screen on the display 52. Then, control proceeds to step S120.

After the service selection screen or the address input screen is displayed, a user selects one of items, inputs an address, or ends the service mode through use of the operation unit 12.

In step S120, the control unit 11 waits for a user operation performed through the operation unit 12 on the service selection screen or the address input screen. If the user operation is accepted, control proceeds to step S122 where the control unit 11 judges whether the user operation is an operation for selecting a link. Specifically, in step S122, the control unit 11 judges that the user operation is an operation for selecting a link if a selection is made successfully by a user on the service selection screen displayed in step S116 or if a URL is successfully inputted to the input screen displayed in step S118.

If the user operation is not an operation for selecting a link (S122: NO), control proceeds to step S124 where the control unit 11 judges whether the user operation accepted at step S120 is an operation for ending the service mode. If the user operation is an operation for ending the service mode (S124: YES), control returns to step S104. That is, in this case the process as a service mode terminates.

If it is judged in step S124 that the user operation is not an operation for ending the service mode (S124: NO), control proceeds to step S126 where the control unit 11 produces a beeping sound. Then, control returns to step S1120. That is, if the user operation accepted in step S120 is not an operation for selecting a link and is not an operation for ending the service mode, the beep sound is produced so as to notify a user that the user operation is invalid.

If the user operation is an operation for selecting a link (S122: YES), control proceeds to step S1128 where the control unit 11 judges whether the selected link is represented by a URL for a service (i.e., the control unit 11 judges whether the selected link is an address for requesting a service from the function server).

If the selected link is not represented by a URL for a service (i.e., the selected link is an address of another piece of service definition information 25) (S128: NO), control proceeds to step S130 where the control unit 11 requests a service list from the directory server 20, and then receives service definition information 25. Then, control returns to step S116 so as to display a new service selection screen on the display 52.

If the selected link is represented by a URL of a service (S128: YES), control proceeds to step S132 where a session process (which is explained in detail later) is executed. After the step S132 is finished, control returns to step S104. The service mode process is thus terminated.

Hereafter, the session process executed in the step S132 of the MFP process (FIG. 3) will be explained referring to a flowchart of FIG. 5.

At the start of the session process, the MFP 10 activates a service corresponding to a link location selected at step S120 (or corresponding to an address if the address is directly inputted by a user) (S202). The MFP 10 sends a service initiation command to the link location as an HTTP request to instruct the function server 30 to initiate a service selected in step S120. After receiving the service initiation command, the function server 30 sends a session ID back to the MFP 10 as an HTTP response.

In response to the service initiation command of S201, the MFP 10 receives a session ID from the function server 30 (S204). Each of HTTP requests and HTTP responses exchanged between the MFP 10 and the function server 30 includes a session ID, and the function server 30 is able to manage devices (i.e., to conduct session management for devices), communicating with the function server 30, in accordance with session IDs contained in HTTP requests or HTTP responses.

Subsequently, the MFP 10 transmits the "MFP command inquiry" (inquiring about instructions to the MFP 10) to the function server 30 (S206). After receiving the MFP command inquiry from the MFP 10, the function server 30 sends a command back to the MFP 10 if a command to be sent to the MFP 10 is issued in processes of the function server 30. If commands to be sent to the MFP 10 do not exist, the function server 30 sends a command representing "no command" back to the MFP 10. In response to the MFP command inquiry of S206, the MFP 10 receives a command from the function server 30 (S208).

Subsequently, the MFP 10 judges whether the command received in S208 is a job initiation command (S210). The job initiation command is issued by the function server 30 after the function server 30 receives the service initiation command. The type of a job to be executed by the MFP 10 is decided by the function server based on various factors including timing of reception of an inquiry and the type of a service to be initiated. A job ID of the job to be initiated, the type of the job, and a destination address of the job are contained in the job initiation command.

If the command received in S208 is a job initiation command (S210: YES), the MFP 10 reserves resources necessary for the initiation of the job (S212), and starts a process for initiating the designated job (S213). The control unit 11 initiates the designated job by passing the job ID and the destination address to the job. The job thus initiated is executed concurrently with other processes. That is, various services can be performed concurrently in the content providing system 100. In this embodiment, a service registration application job will be explained later with reference to FIG. 6.

After the job is initiated, the control unit 11 waits a prescribed time interval (S214). Then, control returns to step S206.

If the command received in S208 is not a job initiation command (S210: NO), the MFP 10 judges whether the command is a job end command (S216). The job end command is issued in the function server 30 at the time of termination of the job. A Job ID of the terminated job is contained in the job end command.

If the command received in S208 is a job end command (S216: YES), the MFP 10 ends the job corresponding to the job ID while releasing the resources (S208), and waits the prescribed time interval (S214). Then, control returns to step S206.

If the command received in S208 is not a job end command (S216: NO), the MFP 10 judges whether the command indicates "no command", i.e., whether the response to the MFP command inquiry indicates that there is no command (S220).

If the command received in S208 indicates "no command" (S220: YES), the MFP 10 waits the prescribed time interval (S214), and control returns to step S206.

If the command received in S208 does not indicate "no command" (S220: NO), the MFP 10 judges whether the command is a session end command (S222). The session end command is issued in the function server 30 at the time of termination of the service for the MFP 10.

If the command received in S208 is the session end command (S222: YES), the MFP 10 ends the session process. If the command received in S208 is not the session end command, that is, if the command is none of the job initiation command, the job end command, the "no command" and the session end command (e.g., if the command is an error notification) (S222: NO), the MFP 10 executes a command error process (e.g. displaying an error message on the display 52) (S224). Then, the session process terminates.

Hereafter, a service registration application job to be executed as one of jobs initiated in step S213 of the session process will be explained with reference to FIG. 6. The service registration application job is executed under control of the control unit 11 of the MFP 10.

First, the control unit 11 displays an ID input screen for requesting a user to input a user ID, on the display 52. After a user operation for inputting a user ID is accepted (S302), the control unit 11 operates to cause the function server 30 to initiate a service registration application job (S304). Specifically, the control unit 11 sends a service initiation command to an address of the subscription service designated in the service definition information 25, together with the inputted user ID, as an HTTP request.

After receiving the service initiation command, the function server 30 sends a parameter request for an application for a service (hereafter, the parameter request is referred to as a service application parameter request) back to the MFP 10, together with the session ID, as an HTTP response. The service application parameter request is issued in the function server 30 when the function server 30 receives the service initiation command, and is formed as XML data for requesting a service parameter from the MFP 10.

As described above, the service initiation command is sent to the function server 30 together with the user ID which is inputted by the user each time the service registration application job is initiated. However, the service initiation command may be sent to the function server 30 together with a user ID stored in advance in the MFP 10.

Next, the control unit 11 receives the service application parameter request and the session ID which are sent by the function server 30 in response to the service initiation command (S306).

Next, the control unit 11 generates a parameter input screen based on the service application parameter request, and displays the parameter input screen on the display 52 so as to request a user to input a service parameter (S308). FIG. 4C shows an example of a parameter input screen. As shown in FIG. 4C, a character string representing a name of a subscription service is displayed at the tope portion of the screen, and service types to be requested ("English version" and "Japanese version") are displayed under the name of the service on the screen. The user is able to designate one of the service types as a service parameter through the parameter input screen.

After a user operation for designating the service parameter is accepted (S310), the control unit 11 sends the service parameter to the function server 30 as an HTTP request (S312). After receiving the service parameter, the function server 30 conducts a user registration operation, and then sends polling information back to the MFP 10. The polling information is information generated by the function server 30 after the function server 30 receives the service parameter. More specifically, the polling information includes a polling URL which is a destination address to be used for a polling operation for the subscription service, a polling ID used for a polling operation, and an interval between polling operations.

The control unit 11 receives the polling information from the function server 30 (S314). Then, the control unit 11 registers the polling information in polling management information (S316). FIG. 7 shows an example of a data structure of the polling management information stored in the storage unit 16 of the MFP 10. As shown in FIG. 7, in the polling management information, a polling URL ("PollURL"), a polling ID ("PollID"), a time interval ("Interval"), a service name representing contents of a service ("Service Name"), and a service status ("Status") are stored. In step S316, the polling URL, polling ID, time interval, service name and service status contained in the polling information received in step S314 are registered in the polling management information while the polling URL, polling ID, interval, service name and service status are associated with each other. The service name is a name of a service corresponding to an item selected by the user in step S120 of the MFP process. The service status is set to a state of "running" as an initial state.

Next, the control unit 11 executes an ending process (S320). Then, the service registration application job terminates. Specifically, in step S320, the control unit 11 sends a service end command to the function server 30 as an HTTP request, and thereafter receives a service end confirmation, which is issued by the function server 30 after the function server 30 receives the service end command, as an HTTP response.

Hereafter, a polling process to be executed under control of the control unit 11 of the MFP 10 will be explained with reference to FIG. 8. The polling process is initiated in accordance with the polling management information. That is, the polling process is executed repeatedly while at least a piece of polling information (the polling URL, polling ID, time interval, service name and service status arranged in a row in FIG. 7) is stored in the polling management information. If the polling management information becomes empty, the polling process terminates.

In the polling process, first, the control unit 11 conducts an initialization (S402). In step S402, the control unit 11 assigns timers to polling information rows, respectively, and each timer starts counting down starting from its corresponding time interval value.

Next, the control unit 11 judges whether a polling target to be polled exists (S404). In step S404, the control unit 11 judges that a polling target exists if the timer corresponding to the polling target is zero. In this case, the polling target is a server located by the polling URL in the polling information row corresponding to the timer. Step S404 is repeated until a polling target is found (S404: NO).

If a polling target is found (S404: YES), control proceeds to step S406 where the control unit 11 polls a server located by the polling URL. In step S406, the control unit 11 sends the polling ID associated with the polling URL in the polling management information, to the polling URL, as an HTTP request (a polling packet) for requesting contents.

After a server (the function server 30 in this embodiment) receives the polling packet, the server sends a polling response (including a service start instruction for receiving contents) back to the MFP 10 as an HTTP response if the server has contents to be provided for the MFP 10. On the other hand, if the server does not have contents to be provided for the MFP 10, the server sends a polling response (not having the service start instruction) back to the MFP 10. The service start instruction represents a session ID and a session URL required to receive contents. In step S406, the control unit 11 instructs the timer corresponding to the polling target (i.e., the timer of which count value is zero) to start counting down starting from the time interval value.

After the control unit 11 receives the polling response from the server (S408), the control unit 11 judges whether the service start instruction is contained in the polling response. If the service start instruction is not contained in the polling response (S410: NO), control returns to step S404. If the service start instruction is contained in the polling response (S410: YES), the control unit 11 operates to initiate a service based on the session ID and session URL contained in the polling response (S412).

In step S412, the control unit 11 sends a service initiation command (including the session ID designated by the service start instruction) to the session URL designated by the service start instruction, as an HTTP request, so that the server (the function server 30 in this embodiment) corresponding to the session URL initiates a process for providing contents.

After the server receives the service initiation command, the server sends an initiation command of a print job back to the MFP 10 as an HTTP response. In step S414, the control unit 11 receives the initiation command of a print job. Then, the control unit 11 reserves necessary resources for the job (S416).

Next, in step S418, the control unit 11 initiates a print job. Then, control returns to step S404. Specifically, in step S418, the control unit 11 initiates the print job by passing the session ID and the session URL designated by the service start instruction to the job. The print job thus initiated may be executed concurrently with other processes.

Hereafter, a print job to be executed under control of the control unit 11 of the MFP 10 will be explained with reference to FIG. 9. As described above, the print job is initiated in step S418 of the polling process.

In the print job, first, the control unit 11 sends a content request for requesting contents to the session URL passed from the polling process (S 502). After receiving the content request, the server (the function server 30 in this embodiment) sends print data representing contents to be provided for the MFP 10, back to the MFP 10, as an HTTP response.

After the control unit 11 receives the print data from the server (S504), the control unit 11 control the recording unit 14 to record an image represented by the print data on a recording medium (S506). Then, the control unit 11 sends a reception confirmation confirming the reception of the print data to the session URL, together with the session ID passed from the polling process, as an HTTP request (S508). After the server receives the reception confirmation, the server sends a response confirming reception of the reception confirmation, back to the MFP 10, as an HTTP response.

After the control unit 11 receives the response confirming reception of the reception confirmation from the server (S510), the control unit 111 releases the resources reserved in step S416 (S512). Then, the print jib terminates.

Hereafter, a service management process to be executed under control of the control unit 11 of the MFP 10 will be explained with reference to FIG. 10. As described above, the service management process is initiated in step S108 of the MFP process (see FIG. 3).

In the service management process, first, the control unit 11 displays an ID input screen for requesting a user to input a user ID, on the display 52, and accepts a user operation for inputting a user ID through the operation unit 12 (S601). Then, the control unit 111 displays an available service screen representing the service types (service names) registered in the polling management information, on the display 52 (S602).

FIG. 11A shows an example of an available service screen. As shown in FIG. 11A, a string "available services" is displayed at the top portion of the screen, and service names, each of which is accompanied by a service status, registered in the polling management information are displayed under the string "available services" as selectable items. After the available service screen is displayed, the user is bale to designate one of the service names using the operation unit 12. The available service screen (and other menu screens described below) is generated in accordance with a hierarchical menu structure shown in FIG. 12.

After the available service screen is displayed, the control unit 11 accepts an user operation for designating a service name (S604). Then, the control unit 11 extracts the polling URL and the polling ID from the polling management information, and saves the extracted information temporarily in an internal memory of the control unit 11 (S606).

Next, the control unit 11 displays a service distribution control screen for requesting the user to designate a control item regarding the distribution of contents to be provided according to the service (service name) designated in step S604, on the display 52 (S608). FIG. 11B shows an example of a service distribution control screen. As shown in FIG. 11B, a string "Control of Service Distribution" is displayed at the top portion of the screen, and "Suspend", "Restart" and "Delete", each of which relates to a way of distributing contents of the designated service, are displayed under the string "Control of Service Distribution" as selectable items. The user is able to designate one of the selectable items using the operation unit 12.

After a user operation for designating an item through the service distribution control screen is accepted (S610), the control unit 11 checks the designated item (S612). If the designated item is the item "Delete" (S612: YES), control proceeds to step S614 where the control unit 11 sends a removal command for instructing the server to remove registration of a service to the server, together with the polling ID (which is extracted from the polling management information together with the polling URL) and the user ID, as an HTTP request (S614). The server (the function server 30 in this embodiment) which received the removal command executes a process for removing registration of the service corresponding to the polling ID accompanying the removal command, and sends a completion notification indicating completion of the process for removing the service, back to the MFP 10, as a response command (HTTP response) to the removal command.

After the control unit 11 deletes the polling information row corresponding to the service designated in step S604 (S615), control proceeds to step S616. If the control unit 11 receives the response command from the server (S616), the service management process terminates.

If it is judged in step S612 that the designated item is not the item "Delete" (S612: NO), control proceeds to step S618 where the control unit 11 judges whether the designated item is the item "Suspend". If the designated item is the item "Suspend" (S618: YES), the control unit 11 displays a suspending time handling designation screen for requesting a user to designate a handling way indicating how the contents, which can not be delivered to the user during a suspending time (i.e., a suspending state), should be handled, on the display 52 (S620). FIG. 11C shows an example of a suspending time handling designation screen. As shown in FIG. 11C, a string "Handling of Distribution Data during Suspending Time" is displayed at the top of the screen, and items "Discard" and "Accumulate in Server" are also displayed under the string "Handling of Distribution Data during Suspending Time", as selectable items.

After the suspending time handling designation screen is displayed, the user is able to designate one of the handling ways using the operation unit 12. After a user operation for designating a handling way is accepted (S622), the control unit displays a date designation screen for requesting the user to designate a date for releasing the suspending state, on the display 52 (S624). FIG. 13A is an example of a date designation screen. As shown in FIG. 13A, a string "Designation of Date" is displayed at the top portion of the screen, and items "until instructed by the user" and "specify date" are displayed under the string "Designation of Date", as selectable items.

After the date designation screen is displayed, the user is able to conduct an operation for designating the date using the operation unit 12. If the item "specify date" is designated, the control unit 11 displays a date input screen for requesting the user to directly input the date for releasing the suspending state. FIG. 13B is an example of a date input screen. By setting the date through the date input screen shown in FIG. 13B, the designation of the date is finished.

After the control unit 11 accepts the user operation for designating the date for releasing the suspend state (S626), the control unit 11 sends a suspend command for suspending temporarily the providing of the service to the polling URL saved temporarily in step S606, together with the polling ID saved in step S606, the handling way designated in step S622, the date designated in step S626, and the user ID accepted in step S601 (S628). After the server (the function server 30 in this embodiment) corresponding to the polling URL receives the suspend command, the server executes a process for suspending the providing of the contents of the service registered in association with the polling ID accompanying the suspend command, and sends a completion notification indicating the completion of the process for the suspend command back to the MFP 10 as a response command (an HTTP response) to the suspend command.

After sending the suspend command, the control unit 11 receives the response command in step S616. Then, the service management process terminates.

If it is judged in step S618 that the designated item is the item "Restart" (S618: NO), the control unit 11 displays an accumulated data handling designation screen for requesting the user to designate handling of the accumulated data during the suspend state, on the display 52 (S630). FIG. 14A shows an example of an accumulated data handling designation screen. As shown in FIG. 14A, a string "Accumulated Distribution Data" is displayed at the top portion of the screen, and items "Discard All of the Contents", "Print All of the Contents" and "Print Separately/Discard" are displayed under the string "Accumulated Distribution Data" as selectable items. After the accumulated data handling designation screen is displayed, the user is able to designate one of the items (handling ways) by using the operation unit 12.

After a user operation for designating a handling way through the accumulated data handling designation screen is accepted (S632), the control unit judges whether the designated item is the item "Print Separately/Discard" (S634). If the designated item is not the item "Print Separately/Discard" (S634: NO), control proceeds to step S636 where the control unit 11 sends a restart command for instructing the server to restart the distribution of contents to the polling URL extracted in step S606, together with polling ID saved in step S606 and the handling way designated in step S632, as an HTTP request.

After the server (the function server 30 in this embodiment) receives the restart command, the server executes a process for restarting the distribution of contents of the service registered in association with the polling ID accompanying the restart command, and sends a completion notification indicating the completion of the process for the restart back to the MFP 10, as a response command (HTTP response) to the restart command. After the control unit 11 sends the restart command, the control unit 11 receives the response command (S616). Then, the service management process terminates.

If the designated item is the item "Print Separately/Discard" (S634: YES), the control unit 11 sends a list request command requesting for a list of contents accumulated in the server during the suspend state, to the polling URL extracted in step S606, together with the polling ID saved in step S606 and the user ID accepted in step S601 (S638). The list request command is sent as an HTTP request. After receiving the list request command, the server (the function server 30 in this embodiment) sends a content list representing a list of contents, which are stored in the server in association with the polling ID accompanying the list request command, back to the MFP 10 as a response command to the list request command.

After the control unit 11 receives the content list from the server (S640), the control unit 11 displays a separate setting screen for requesting a user to decide whether the user prints the contents or discards the contents, for each of items contained in the content list, on the display 52 (S642). FIG. 14B shows an example of the separate setting screen. As shown in FIG. 14B, a string "Handling Of Accumulated Data" is displayed at the top of the screen, and information regarding content items listed in the content list (e.g., a date when the contents were scheduled to be delivered) accompanied by respective handling ways (character strings) is also displayed under the string "Handling Of Accumulated Data". After the separate setting screen is displayed, the user is able to designate and confirm the handling way for each content item.

For example, the separate setting screen may be configured such that all of the handling ways to be associated with the content items are ser to "Print" as default values, the setting of the handling way can be switched between "Print" and "Discard" using the right and left cursor keys, and that the setting of the handling way can be confirmed by using the OK key 50.

After a user operation for confirming the handling way for each item is accepted (S644), the control unit 11 sends a restart command requesting the server to restart distribution of contents, to the polling URL extracted in step S606, together with polling ID saved in step S606, the handling way determined in step S640, and the user ID accepted in step S601 (S646). The restart command is sent as an HTTP request. The server (the function server 30 in this embodiment) which has received the restart command sends an end notification indicating that a process for restarting distribution of contents is executed, back to the MFP 10, as an response command (HTTP response) to the restart command.

Next, the control unit 11 receives the response command from the server (S616). Then, the service management process terminates.

Hereafter, operations performed by the function server 30 will be explained. FIG. 15 is a flowchart illustrating a function server process to be executed under control of the control unit 31 of the function server 30. The function server process is started each time the function server 30 receives an HTTP request.

First, the function server 30 judges whether the received HTTP request is the service initiation command (S702). Incidentally, the service initiation command is transmitted by the MFP 10 in step S202 of the session process (FIG. 5).

If the received HTTP request is the service initiation command (S702: YES), the control unit 31 generates a session ID and transmission data representing the session ID, secures resources for execution of a service, and then initiates a session process (see FIG. 16) (S708). Next, the control unit 31 sends the transmission data back to the MFP 10 as an HTTP response (S710). Then, the function server process terminates. It should be noted that the transmission data (session ID) is received by the MFP 10 in step S204 of the session process of the MFP 10 (see FIG. 5).

If it is judged in step S702 that the HTTP request is not the service initiation command (S702: NO), the control unit 31 judges whether the HTTP request is a service end command (S712). It should be noted that the service end command is transmitted from the MFP 10 in step S320 (see FIG. 6) or the service end command is transmitted from the MFP 10 when a user operation for terminating the service (e.g., pushing the cancel key 51) is conducted.

If the HTTP request is a service end command (S712: YES), the control unit 31 releases the session ID and the resources secured in step S708, and generates a session end command (S714). Next, the control unit 31 sends the session end command back to the MFP 10 as an HTTP response (S710). Then, the function server process terminates. It should be noted that the session end command is received by the MFP 10 in step S208, and reception of the session end command is confirmed in step S222 as shown in FIG. 5.

If it is judged in step S712 that the HTTP request is not a service end command (S712: NO), the control unit 31 judges whether the HTTP request contains information about a service (S716). Specifically, the control unit 31 judges whether the HTTP request is issued by the MFP 10 in one of the session process and another job.

If the HTTP request contains information about the service (S716: YES), the control unit 31 identifies the process (the session process or job) that has transmitted the HTTP request (S718). If the process can not be identified (S720: NO), control proceeds to step S722 where the function server 30 generates error notification information. Then, control proceeds to step S736.

If the process can be identified (S720: YES), the function server 30 sends the information supplied together with the HTTP request, to the identified process (S724). Then, control proceeds to step S726. If no information about the service is contained in the HTTP request (S716: NO), control directly proceeds to step S726. In step S726, the control unit 31 identifies a memory area storing information corresponding to the session ID or job ID.

Subsequently, the function server 30 judges whether the memory area storing the information corresponding to the session ID or job ID can be identified (S728). If the memory area can not be identified (S728: NO), the function server 30 generates error notification information (S722). Then, control proceeds to step S736.

If the memory area can be identified (S728: YES), the function server 30 judges whether there exists reply information to be sent back to the MFP 10 (S730). If there exists the reply information to be sent back to the MFP 10 (S730: YES), the function server 30 generates an MFP control command based on the return information (S734). Then, control proceeds to step S736. If there exists no replay information to be sent back to the MFP 10 (S730: NO), the function server 30 generates information indicating "no MFP command" (S732). Then, control proceeds to step S736.

In step S736, the control unit 31 sends information generated in one of steps S722, S732 and S734 to a client device (i.e., the MFP 10) as an HTTP response. The error notification information generated in step S722 is received by the MFP 10 in step S208, and is used in step S224. The information of "no command" is received by the MFP 10 in step S208, and reception of the "no command" is confirmed in step S220. The MFP control command generated in step S734 varies depending on the job type, and is received by the MFP 10 in the corresponding job.

In step S738, the control unit 31 assigns information "transmission completion" to a memory having an address corresponding to the session ID or job ID. Then, the function server process terminates.

Hereafter, a session process (a server side session process) executed under control of the control unit 31 of the function server 30 will be explained with reference to FIG. 16. The session process is executed concurrently with the function server process.

First, the control unit 31 executes an initialization process (S802). Next, the control unit 31 initiates a job corresponding to the service designated by the service initiation command (S804). It should be noted that the service initiation command is issued by the MFP 10 in step S202, and reception of the service initiation command is confused by the function server 30 in step S702 of the function server process.

Next, in step S806, the control unit 31 issues an MFP command corresponding to the initiated job. Specifically, in step S806, the control unit 31 writes a job initiation command in a memory area for storing reply information, together with a job ID and a destination address. Based on the reply information, the MFP command is generated in step S734, and the reply information is sent to the MFP 10 as a job initiation command. The job initiation command is received by the MFP 10 in step S208 (see FIG. 5), and the job designated by the job initiation command is initiated by the MFP in step S213.

Next, the control unit 31 waits until the job initiated in step S804 terminates (S808: NO). If the job terminates (S808: YES), the control unit 31 sends a job end command for the initiated job to the MFP 10 as an MFP command (S810). Specifically, the control unit 31 writes the job end command and the job ID in the memory area for the reply information.

Based on the reply information, the MFP command is generated in step S734, and the reply information is sent to the MFP 10 as a job end command. The job end command is received by the MFP 10 in step S208 (see FIG. 5), and the job designated by the job end command is terminated in the MFP 10 in step S218.

Next, in step S812, the control unit 31 executes an end process including a process for releasing the resources for the job. Then, the session process of the function server 30 terminates (S814). Specifically, in step S814, the control unit 31 writes the session end command in the memory area for storing the reply information. Based on the reply information, the MFP command is generated in step S734, and the reply information is sent to the MFP 10 in step S736. The session end command is received by the MFP 10 in step S208 (see FIG. 5), and the reception of the session end command is confirmed by the MFP 10 in step S222.

Hereafter, a service registration acceptance job will be explained with reference to FIG. 17. The service registration acceptance job is executed as one of jobs to be initiated in step S804 of the server side session process.

First, the control unit 31 generates a session ID used for conducting session management with a client device (the MFP 10 in this embodiment) which transmitted the user ID and the service initiation command to the function server 30 (S904). The communication with the client device (i.e., function server 30) is conducted in accordance with the session ID.

Next, the control unit 31 sends a service application parameter request to the MFP 10, together with the session ID generated in step S904, as an HTTP response (S906). The service application parameter request is received by the MFP 10 in step S306 of the service application registration job, and is XML data for requesting a service parameter from the MFP 10. After the MFP 10 receives the service application parameter request, the MFP 10 sends a service parameter to the function server 30 as an HTTP request.

After the function server 30 receives the service parameter from the MFP 10 (S908), the control unit 31 generates a polling ID to be used for polling the function server 30 (S910), and stores the polling ID in user management information (S912). FIG. 18 is an example of a data structure of the user management information. As shown in FIG. 18, a polling ID ("PollID"), a service status ("Status"), a storage location for data storage ("Folder"), a status attribute, a restart date for restarting distribution of contents ("date"), and other kinds of information are stored in the user management information, while being associated with each other. In step S912, the polling ID generated in step S910, the storage location (i.e., a folder name) allocated for data storage for the MFP 10, the service type designated by the service parameter are registered in the user management information while being associated with the received user ID. The service status is set to "Running" in an initial state. The item status attribute is empty in an initial state.

Next, the control unit 31 generates the polling information containing the polling URL representing an address to be used for polling the function server 30, the polling ID generated in step S910 and the time interval between polling operations (S914). Then, the control unit 31 sends the polling information to the MFP 10 as an HTTP response (S916). As described above, the polling information is received by the MFP 10 in step S314 (see FIG. 6). After the MFP 10 receives the polling information, the MFP 10 sends the service end command to the function server 30 as an HTTP request.

Next, the control unit 31 executes an ending process (S918). Then, the service registration acceptance job terminates. Specifically, in step S918, the control unit 31 receives the service end command from the MFP 10 which received the polling information transmitted by the function server 30 in step S916, and sends a service end confirmation indicating the completion of the service, back to the MFP 10, as an HTTP response.

Hereafter, a content preparation process to be executed under control of the control unit 31 of the function server 30 will be explained with reference to FIG. 19. The content preparation process is executed repeatedly after the function server 30 starts up.

First, the control unit 31 waits until new contents are created and stored in a memory area for contents in the storage unit 33 (S1002). Specifically, the control unit 31 waits until new contents, which are crated in accordance with a predetermined time schedule or are created at an irregular time intervals, are stored, or contents transmitted from an external device via the network 1 are stored in the memory area for contents.

Next, the control unit 31 selects one of pieces of user management information as target user management information (S1004), and selects one of information rows in the user management information as a target user management information row (the polling ID, service status, storage location, status attribute, a restart date, and other kinds of information arranged in a row in a lateral direction in the user management information) (S1006).

If the "service status" (i.e., a status of content supply) in the target information row is "Running" (S1008: YES), or the "Status Attribute" in the target information row is "Accumulate" (S1010: YES), control proceeds to step S1012. In step S1012, contents created in step S1002 are stored in a memory area indicated by the storage location ("Folder"). Then, control proceeds to step S1014.

If the "service status" (i.e., a status of content supply) in the target information row is not "Running" (S1008: NO), and the "Status Attribute" in the target information row is not "Accumulate" (S1010: NO), control proceeds to step S1014. In step S1014, the control unit 31 judges whether all of the user management information rows have been processed. If all of the user management information rows have not been processed (S1014: NO), the control unit 31 selects a next user management information row as a target information row (S1016). Then, control returns to step S1008.

If all of the user management information rows have been processed (S1014: YES), control proceeds to step S1018 where all of the pieces of user management information stored in the function server 30 have been processed. If all of the pieces of user management information stored in the function server 30 have not been processed (S1018: NO), the control unit 31 selects unprocessed one of the pieces of user management information as target user management information (S1020). Then, control returns to step S1006. If all of the pieces of user management information stored in the function server 30 have been processed (S1018: YES), the content preparation process terminates.

Hereafter, a polling response process to be executed under control of the control unit 31 of the function server 30 will be explained with reference to FIG. 20. The polling response process is initiated each time the function server 30 receives a polling packet from the MFP 10. The polling packet is transmitted from the MFP 10 in step S406 of the polling process (See FIG. 8).

First, the control unit 31 searches for contents to be distributed to the client device (MFP 10) which has transmitted the polling packet (S1102). Specifically, the control unit 31 identifies the user management information row corresponding to the polling ID contained in the polling packet, and searches the identified user management information row for print data (contents) located by the "Storage Location" in the identified user management information.

Next, in step S1104, the control unit 31 judges whether the contents to be distributed to the MFP 10 is found. If the contents to be distributed to the MFP 10 is not found (S1104: NO), the control unit 31 sends a polling response indicating that the contents to be distributed is not found, back to the MFP 10, as an HTTP response (S1106). Then, the polling response process terminates.

If the contents to be distributed to the MFP 10 is found (S1104: YES), the control unit 31 generates a service initiation command indicating the execution of distribution of contents (S1108). Specifically, the control unit 31 generates a session ID, and then generates the service initiation command containing the session ID and a session URL representing an address to be used to receive contents. In step S1108, the control unit 31 may execute a process for registering the session ID (for example, in the user management information) while associating the session ID with the polling ID designated by the polling packet.

Next, the control unit 31 sends the polling response indicating that the contents to be distributed to the MFP 10 are found, back to the MFP 10, together with the service initiation command generated in step S1108 (S1110). The polling response is transmitted as an HTTP response. As described above, the polling response is received by the MFP 10 in step S408 (see FIG. 8). After receiving the polling response, the MFP 10 sends the service initiation command and the session ID, to the function server 30, as an HTTP request.

After the control unit 31 receives the service initiation command from the MFP 10 (S1112), the control unit 31 sends an initiation command of a print job for instructing a client device to initiate a print job, to the MFP 10, as an HTTP response (S1114). As described above, the initiation command of a print job is received by the MFP 10 in step S414 (see FIG. 8). After receiving the initiation command of a print job, the MFP 10 sends a content request requesting for contents, to the function server 30, as an HTTP request.

After the control unit 31 receives the content request form the MFP 10 (S116), the control unit 31 identifies the polling ID corresponding to the content request (or the session ID accompanying the content request), and then searches for the contents to be delivered to the MFP 10 based on the polling ID (S1118). Next, the control unit 31 sends print data representing the contents obtained as described above, to the MFP 10, as an HTTP response (S1120).

Specifically, in step S1118, the control unit 31 identifies the polling ID using the user management information in which the polling ID is associated with the session ID. As described above, the pint data outputted in step S1120 is received by the MFP 10 in step S504 (see FIG. 9). After receiving the print data, the MFP 10 sends a reception confirmation confirming the reception of print data, to the function server 30, as an HTTP request.

After the control unit 31 receives the reception confirmation (S1122), the control unit 31 deletes the contents corresponding to the print data from the memory area for contents (S1124). Then, the control unit 31 sends a result response indicating reception of the reception confirmation, to the MFP 10, as an HTTP response (S1126). Then, the polling response process terminates. The result response is received by the MFP 10 in step S510 of the print job (see FIG. 9).

Hereafter, a service management process (a server side service management process) to be executed under control of the control unit 31 of the function server 30 will be explained with reference to FIG. 21. The service management process is executed each time the function server 30 receives a command from a client device.

First, the control unit 31 checks the type of the received command (S1202). If the command is the list request command (S1202: YES), the control unit 31 searches for the contents to be delivered to the client device which has transmitted the list request command, and generates a content list representing a list of the searched contents (S1204). Specifically, the control unit 31 identifies the user management information corresponding to the user ID contained in the list request command, and searches for contents stored in the memory area located by the "storage location" associated with the polling ID accompanying the list request command. Then, the control unit 31 generates the content list in accordance with the search result. As described above, the list request command is transmitted by the MFP 10 in step S638 (see FIG. 10).

After the control unit 31 sends the content list to the MFP 10 (S1206), the service management process terminates. As described above, the content list transmitted in step S1206 is received by the MFP 10 in step S640 (see FIG. 10). After receiving the content list, the MFP 10 sends a restart command to the function server 30 in step S646 (see FIG. 10).

If the command is not the list request command (S1202: NO), control proceeds to step S1214 where the control unit 31 judges whether the command is a deletion command. If the command is the deletion command (S1208: YES), the control unit 31 deletes the user management information row stored in the user management information in accordance with the deletion command (S1210). Specifically, the control unit 31 deletes the user management information row corresponding to the polling ID transmitted form the MFP 10 with the deletion command so that the registration of the user is deleted. As described above, the deletion command is transmitted by the MFP 10 in step S614 (see FIG. 6).

Next, the control unit 31 sends an end notification indicating the completion of deletion of registration to the MFP 10 as a response command (HTTP response) to the deletion command (S1212). Then, the service management process terminates.

If the command is not the deletion command (S1208: NO), control proceeds to step S1214 where the control unit 31 judges whether the command is the suspend command. If the command is the suspend command (S1214: YES), the control unit 31 updates the user management information based on the suspend command (S1216). In step S1216, the control unit 31 changes the service status corresponding to the polling ID accompanying the suspend command to "Suspend" indicating that the distribution of contents is suspended. Further, the "Restart Date" corresponding to the polling ID is changed to a date accompanying the suspend command. The status attribute corresponding to the polling ID is also changed to a value corresponding to the handling way accompanying the suspend command. If the handling way is "Discard", the status attribute is set to "Discard". If the handling way is "Accumulate in Server", the status attribute is set to "Accumulate".

After step S1216 is processed, control proceeds to step S1212 where the control unit 31 sends an end notification indicating that the distribution of contents is suspended, to the MFP 10, as an response command (HTTP response) to the suspend command. Then, the service management process terminates.

If the command is not the suspend command (S1214: NO), control proceeds to step S1223 where the control unit 31 judges whether the handling way indicated by the restart command is "Discard All Of The Contents". If the handling way indicated by the restart command is "Discard All Of The Contents" (S1218: YES), the control unit 31 searches for contents to be delivered to the client device which has transmitted the restart command, and deletes all of the searched contents (S1220). Then, control proceeds to step S1222. Specifically, in step S1220, the control unit 31 deletes all of the contents stored in the memory area located by "Storage Location" corresponding the polling ID accompanying the restart command. As described above, the restart command is transmitted by the MFP 10 in step S636 (see FIG. 6).

In step S1222, the control unit 31 updates the user management information in accordance with the received restart command. Specifically, the control unit 31 changes the service status corresponding to the polling ID accompanying the restart command to the parameter ("Running") indicating that the distribution of the contents is running, and deletes the value of the "status attribute" corresponding to the polling ID. Next, in step S1212, the control unit 31 sends a end notification indicating that deletion of the contents is finished, to the MFP 10, as an HTTP response. Then, the service management process terminates.

If the handling way indicated by the restart command is "Print All of the Contents" (S1218: NO, S1224: YES), control proceeds to step S1222 without processing step S1220.

If the handling way indicated by the restart command is not "Print All of the Contents" (i.e., the handling way indicated by the restart command is "Print Separately/Discard" (S1224: NO), the control unit 31 searches for the contents to be delivered to the client device, and picks contents (to be deleted) from among contents listed in the content list generated in step S1204, and deletes the picked contents (S1226). Specifically, in step S1226, the control unit picks contents, having the handling way "Discard" indicated by the restart command, from among contents stored in the memory area located by "storage location" corresponding to the polling ID transmitted from the MFP together with the restart command, and deletes the picked contents. In this case, the restart command is transmitted from the MFP 10 in step S646 (see FIG. 6).

After the update of the user management information is finished (S1222), the control unit 31 sends an end notification indicating that the contents to be deleted are successfully deleted, to the MFP 10, as an response command to the restart command. Then, the service management command terminates.

Hereafter, a suspend releasing process to be executed under control of the control unit 11 of the MFP 10 will be explained with reference to FIG. 22. The suspend releasing process is executed repeatedly after the MFP 10 starts up.

First, the control unit 11 selects one of the pieces of user management information as target user management information (S1302). Next, the control unit 11 searches the target user management information for an information row which has the service status "Suspend" and has the restart date past the current date (S1304).

If the information row satisfying a searching condition of step S1304 is found (S1306: YES), the service status of the searched information row is set to "Running" (S1308). Then, control proceeds to step S1310. If the information row satisfying the searching condition of step S1304 is not found (S1306: NO), control proceeds to step S1310. After the service status of the information row is changed to "Running", the contents stored in the storage location of the information row is used as a search target of the content search performed in step S1102 of the polling response process (FIG. 20). Therefore, the contents are sent to the client device as the print data in step S1120.

Next, the control unit 11 checks whether all of the pieces of user management information have been processed (S1310). If all of the pieces of user management information have not been processed (S1310: NO), the control unit 11 selects unprocessed user management information as a target (S1312). Then, control returns to step S1302. If all of the pieces of user management information have been processed (S1310: YES), the control unit 11 waits a predetermined time (S1314). Then, control returns to step S1302.

According to the above mentioned embodiment, the MFP 10 is able to control the suspend or the restart of content services to be provided by the function server 30 (see step S608, and S618 to S646). For example, if the MFP 10 receives a suspend command (see S1214 of FIG. 21), the MFP 10 updates the service status of the user management information (see S1216 of FIG. 21), so that even if contents are created for the suspended service, the contents are not stored in the folder (S1010: NO) or the contents are stored in the folder but are not treated as contents to be provided (S1104: NO). Therefore, the providing of contents of the service is suspended until the restart command is issued (S1214: NO).

When the restart command is issued, the handling way of contents obtained in the suspend state (i.e., unoffered contents) is also transmitted to the function server 30 (S622 to S628 of FIG. 10). After the function server received the handling way, the function server updates the status attribute of the user management information (S1216 of FIG. 21), so that the function server operates to handle the unoffered contents stored in the folder corresponding to the client device, in accordance with the received handling way. That is, the function server does not store the contents in the folder if the status attribute is "Discard" (S1010: NO), and the function server stores the contents in the folder if the status attribute is "Accumulate".

If the function server 30 receives the restart command (S1214: NO), the function server updates the service status of the user management information (S1222 of FIG. 21), so that if contents of the service to be provided are created, the contents are stored in the folder (S1010, S1012 of FIG. 19) and the contents are treated as targets to be provided (S1104: YES). In this case, the function server returns to a state in which the function server is able to provide the contents to the MFP 10 (S1108 to S1126 of FIG. 20).

When the restart command is transmitted to the function server, a notification indicating the handling way for unoffered contents can be also sent to the function server (S630 to S646). After the function server receives the handling way of the unoffered contents, the function server handles the contents stored in the folder corresponding to the received notification in accordance with the received handling way. Specifically, the function server deletes all of the contents stored in the folder if the handling way is "Discard All of the Contents", keeps the contents in the folder if the handling way is "Print All of the Contents", and deletes the contents selectively and thereafter updates the service status of the user management information (S1222) if the handling way is "Print Separately/Discard". By this configuration, only the unoffered contents stored in the folder are treated as contents to be provided.

As described above, the MFP 10 (i.e. the user of the MFP 10) is able to suspend or restart the providing of contents, and further the MFP 10 is able to instruct the server of the handling way of contents when the MFP 10 transmits the command (suspend or restart command) to the server. Therefore, after the providing of contents is restarted, the contents are provided for the MFP in accordance with the handling way instructed by the MFP 10 (in the handling way requested by the user).

It should be also understood that if the unoffered contents accumulated in the server during the suspend state are unwanted information for the user, the user is able to instruct the server not to provided such (unwanted) information, and therefore needless consumption of recording media on the MFP 10 can be avoided.

In the above mentioned embodiment, the MFP 10 instructs the server of the handling way of contents when the MFP 10 sends the suspend command or the restart command (S628, S636 and S646 of FIG. 10). Such a configuration eliminates the necessity for data communication to be conducted specifically for transmitting the handling way from the MFP 10 to the server. Therefore, processing burden on the data communication between the MFP 10 and the server can be reduced.

In the above mentioned embodiment, when the suspend command is sent from the MFP 10 to the function server 30 (S620 to S628 of FIG. 10), the MFP 10 (i.e., the user of the MFP 10) is able to select one of the handling ways "Discard" and "Accumulate in Server" (see FIG. 11C). When the restart command is sent from the MFP 10 to the function server 30 (S630 to S646 of FIG. 10), the MFP 10 (i.e., the user of the MFP 10) is able to select one of the handling ways of "Discard All of the Contents", "Print All of the Contents" and "Print Separately/Discard". If the item "Print Separately/Discard" is selected, the MFP 10 is able to selectively request for the pieces of unoffered information, and therefore is able to receive only the unoffered information requested by the MFP 10.

In the above mentioned embodiment, when the suspend command is sent form the MFP 10 to the function server 30 (S620 to S628 of FIG. 10), the MFP 10 (i.e., the user of the MFP 10) is able to designate the date for releasing the suspend state (S624 and S626). If the function server receives the instruction, the function server 30 operates to update the user management information on the designated date. After that, contents of the service to be restarted are treated as a target of the providing of contents (S1104: YES). Consequently, the function server 30 returns to a state in which the function server is able to provide the contents of the service (S1108 to S1126 of FIG. 20).

In other words, when the suspend command is sent from the MFP 10 to the function server 30, the instructions for releasing the suspend state are also sent to the function server. Such a configuration eliminates the necessity for data communication to be conducted specifically for transmitting the restart of the providing of contents. Therefore, processing burden on the data communication between the MFP 10 and the server can be reduced.

Although the present invention has been described in considerable detail with reference to certain preferred embodiments thereof, other embodiments are possible.

For example, a client device for receiving services from the server, such as a printer or a facsimile device may be employed in addition to or in place of the MFP 10 which functions as a client device in the content providing system 100.

Although only one server for providing contents is provided in the content providing system 100, more than one servers each functioning as the function server 30 may be provided in the content providing system 100.

In the above mentioned embodiment, if the restart command is notified to the function server 30, the steps for designating the handling way (to be started from step S630 when the judgment result of step S618 is YES) may be eliminated for the service of which unoffered contents are to be deleted (S620 to S628). Further, a notification indicating that the unoffered contents are deleted may be notified to the MFP 10 before the restart command and the handling way are sent to the function server. Such a configuration ease the user operation, and enhances the service management so as to match the user's intention.

In the above mentioned embodiment, when contents are newly created (S1002 of FIG. 19), the contents are stored in the folder (S1012). As an alternative to such a configuration, an identification of a storage location of the newly created contents may be stored in the folder and the contents may be stored in a storage area other than the folder. In this case, the function server may operate to read the unoffered contents from the different storage area using the identification, and to send the contents read from the different storage area to the MFP 10. It should be understood that such a configuration eliminates the redundancy of storing of the unoffered contents if the same unoffered contents are required to be stored for two or more client devices.

That is, there is no necessity for the server to store the same unoffered contents for two or more client devices. Therefore, the necessity for securing relatively larger memory area for storing unoffered contents in the storage unit 33 of the function server 30 can be eliminated. Such an advantage becomes more remarkable as the number of client devices increases.

What is claimed is:

1. A content providing system, comprising:
a client device configured to receive contents, the client device comprising a first central processing unit configured to execute computer program instructions to provide a plurality of first units, the plurality of first units comprising:
a suspend instruction issuing unit that is configured to instruct a server to suspend a providing of contents;
a handling way designation unit that is configured to accept an accumulate instruction and to instruct the server to sequentially accumulate the contents not provided from the server after the suspend instruction issuing unit instructs the server to suspend providing contents; and
a restart instruction issuing unit that is configured to notify the server of a restart time for restarting the providing of contents after the suspend instruction issuing unit instructs the server to suspend the providing of contents,
wherein the handling way designation unit is further configured to accept separate handling instructions for each of the accumulated contents and to instruct the server to process each of the accumulated contents in accordance with the separate handling instructions, the separate handling instructions including a discard instruction that instructs the server to discard a corresponding one of the accumulated contents and a provide instruction that instructs the server to provide a corresponding one of the accumulated contents to the client device; and a server configured to provide contents to the client device, the server comprising a second central processing unit configured to execute computer program instructions to provide a plurality of second units, the plurality of second units comprising:
a content providing unit that is configured to provide contents to the client device;

a suspending unit that is configured to suspend the providing of contents by the content providing unit if the server is instructed to suspend the providing of contents by the suspend instruction issuing unit of the client device;

a restart unit that is configured to control the content providing unit to restart the providing of contents after the providing of contents is suspended by the suspending unit when the restart instruction issuing unit notifies the server of the restart time and a current time reaches the restart time; and a notification processing unit that is configured to process the accumulated contents in accordance with the separate handling instructions provided by the handling way notification unit of the client device.

2. The content providing system according to claim 1, wherein the handling way designation unit provides the server with the accumulate instruction when the suspend instruction issuing unit instructs the server to suspend the providing of contents.

3. The content providing system according to claim 1, wherein the handling way designation unit provides the server with the separate handling instructions when the restart instruction issuing unit instructs the server to restart the providing of contents.

4. The content providing system according to claim 1, wherein the client device comprises a printing unit that prints the contents provided by the server on a recording medium.

5. The content providing system according to claim 1, wherein the suspend instruction issuing unit is configured to accept a suspend instruction, and to instruct the server to suspend the providing of contents when the suspend instruction is inputted.

6. The content providing system according to claim 1, wherein the restart instruction issuing unit is configured to accept an input of a restart instruction, and to instruct the server to restart the providing of contents when the restart instruction is inputted.

7. The content providing system according to claim 1, wherein the providing of contents from the server to the client device is performed continuously.

8. A client device that is configured to receive contents from a server, the client device comprising:

a printing unit that is configured to print the contents provided by the server on a recording medium;

a central processing unit configured to execute computer program instructions to provide a plurality of other units, the plurality of other units comprise:

a suspend instruction issuing unit that is configured to accept a suspend instruction and to instruct the server to suspend the providing of contents when the suspend command is inputted;

a handling way designation unit that is configured to accept an accumulate instruction and to instruct the server to sequentially accumulate the contents not provided from the server after the suspend instruction issuing unit instructs the server to suspend providing contents; and a restart instruction issuing unit that is configured to accept a restart instruction and to notify the server to of a restart time for restarting, the providing of contents when the restart instruction is inputted after the suspend instruction issuing unit instructs the server to suspend the providing of contents, wherein the server is configured to restart the providing of contents after the providing of contents is suspended in response to the instruction from the suspend instruction issuing unit when the restart instruction issuing unit notifies the server of the restart time and a current time reaches the restart time, and wherein the handling way designation unit is further configured to accept separate handling instructions for each of the accumulated contents and to instruct the server to process each of the accumulated contents in accordance with the separate handling instructions, the separate handling instructions including a discard instruction that instructs the server to discard a corresponding one of the accumulated contents and a provide instruction that instructs the server to provide a corresponding one of the accumulated contents to the client device.

9. A server that is configured to provide contents to a client device, the server comprising:

a central processing unit configured to execute computer program instructions to provide a plurality of units, wherein the plurality of units comprise:

a content providing unit that is configured to provide the contents to the client device;

a suspending unit that is configured to suspend the providing of contents by the content providing unit if the server is instructed to suspend the providing of contents by the client device and to sequentially accumulate the contents not provided by the content providing unit if the server is instructed to accumulate contents by the client device;

a restart unit that is configured to restart the providing of contents by the content providing unit after the providing of contents is suspended by the suspending unit when the client device notifies the server of a restart time at which to restart the providing of contents and a current time reaches the restart time; and a notification processing unit that is configured to process each of the accumulated contents in accordance with separate handling instructions, the separate handling instructions including a discard instruction that instructs the server to discard a corresponding one of the accumulated contents and a provide instruction that instructs the server to provide a corresponding one of the accumulated contents to the client device.

10. A non-transitory computer-readable medium comprising computer program instructions that cause a client device to:

print contents provided by a server on a recording medium with a printing device;

instruct the server to suspend the providing of contents to the client device when an operation for suspending the providing of contents is accepted;

instruct the server to sequentially accumulate the contents not provided from the server after the client device instructs the server to suspend the providing of contents;

notify the server of a restart time at which to restart the providing of contents when an operation for restarting the providing of contents is accepted after the server is instructed to suspend the providing of contents; and provide separate handling instructions to the server for processing at least two of the accumulated contents, the separate handling instructions including a discard instruction that instructs the server to discard a corresponding one of the accumulated contents and a provide instruction that instructs the server to provide a corresponding one of the accumulated contents to the client device, wherein the server is configured to restart the providing of contents after the providing of contents is suspended in response to the instruction to suspend the providing of contents to the client device when the restart instruction issuing unit notifies the server of the restart time and a current time reaches the restart time.

11. A non-transitory computer-readable medium comprising computer program instructions that cause a server to:
provide contents to a client device;
suspend the providing of contents if the server is instructed to suspend the providing of contents by the client device;
sequentially accumulate the contents not provided to the client device after the server is instructed to suspend the providing of contents;
restart the providing of contents after the providing of contents is suspended when the client device notifies the server of a restart time at which to restart the providing of contents and a current time reaches the restart time; and
process at least two of the accumulated contents in accordance with separate handling instructions provided by the client device, the separate handling instructions including a discard instructions that instructs the server to discard a corresponding one of the accumulated contents to the client device.

12. The content providing system according to claim 1, wherein the handling way designation unit is further configured to accept a discard all instruction and a provide all instruction and to instruct the server to process all of the accumulated contents in accordance with each of those instructions, the discard all instruction instructing the server to discard all of the accumulated contents and the provide all instruction instructing the server to provide all of the accumulated contents to the client device.

13. The client device according to claim 8, wherein the handling way designation unit is further configured to accept a discard all instruction and a provide all instruction and to instruct the server to process all of the accumulated contents in accordance with each of those instructions, the discard all instruction instructing the server to discard all of the accumulated contents and the provide all instruction instructing the server to provide all of the accumulated contents to the client device.

14. The content providing system according to claim 1, wherein the plurality of first units further comprise:
a list request issuing unit that is configured to instruct the server to generate a list of the accumulated contents, and
a display unit for displaying the list at the client device; and
the handling way designation unit is further configured to accept one of the different handling instructions for each of the accumulated contents displayed in the list.

15. The client device according to claim 8, wherein the plurality of units further comprise:
a list request issuing unit that is configured to instruct the server to generate a list of the accumulated contents; and
a display unit for displaying the list at the client device,
wherein the handling way designation unit is further configured to accept one of the different handling instructions for each of the accumulated contents displayed in the list.

16. The content providing system according to claim 1, wherein the client device is configured to receive non-sequential accumulated contents from the server when the handling way designation unit accepts the discard instruction for one or more accumulated contents in a sequence and a provide instruction for one or more other accumulated contents in that sequence.

17. The client device according to claim 8, wherein the client device is configured to receive non-sequential accumulated contents from the server when the handling way designation unit accepts the discard instruction for one or more accumulated contents in a sequence and a provide instruction for one or more other accumulated contents in that sequence.

18. The content providing system according to claim 1, wherein
the content relates to news items;
the server is configured to provide the news items to the client device periodically in accordance with a predetermined schedule as part of a subscription service; and
the client device includes a printing unit that is configured print the news items on a recording medium when the news items are received from the server, such that suspending the providing of contents from the server suspends the printing of the news items.

19. The client device according to claim 8, wherein
the content relates to news items;
the server is configured to provide the news items to the client device periodically in accordance with a predetermined schedule as part of a subscription service; and
the printing unit is configured to print the news items on a recording medium when the news items are received from the server, such that suspending the providing of contents from the server suspends the printing of the news items.

* * * * *